United States Patent
Lim et al.

(10) Patent No.: US 10,149,210 B2
(45) Date of Patent: Dec. 4, 2018

(54) DEVICE AND METHOD FOR MAINTAINING SERVICE CONNECTION BY TERMINAL IN WIRELESS COMMUNICATION SYSTEM

(71) Applicant: Samsung Electronics Co., Ltd., Gyeonggi-do (KR)

(72) Inventors: Han-Na Lim, Seoul (KR); Jung-Shin Park, Seoul (KR); Jin-Sung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/508,075

(22) PCT Filed: Aug. 27, 2015

(86) PCT No.: PCT/KR2015/008996
§ 371 (c)(1),
(2) Date: Mar. 1, 2017

(87) PCT Pub. No.: WO2016/036056
PCT Pub. Date: Mar. 10, 2016

(65) Prior Publication Data
US 2017/0245180 A1 Aug. 24, 2017

(30) Foreign Application Priority Data
Sep. 1, 2014 (KR) .................. 10-2014-0115529

(51) Int. Cl.
*H04W 36/00* (2009.01)
*H04W 76/10* (2018.01)
(Continued)

(52) U.S. Cl.
CPC ... *H04W 36/0033* (2013.01); *H04W 36/0072* (2013.01); *H04W 36/08* (2013.01);
(Continued)

(58) Field of Classification Search
CPC ......... H04W 36/0033; H04W 36/0061; H04W 36/0072; H04W 36/0083; H04W 36/08; H04W 60/06; H04W 76/02; H04W 92/20
See application file for complete search history.

(56) References Cited

U.S. PATENT DOCUMENTS 6,393,023 B1 * 5/2002 Shimizu ................ H04L 1/1867
370/389
6,879,832 B1 * 4/2005 Palm .................... H04W 76/021
370/328
(Continued)

FOREIGN PATENT DOCUMENTS

KR 10-2006-0111364 A 10/2006
KR 10-2010-0071796 A 6/2010
(Continued)

OTHER PUBLICATIONS

3GPP TS 23.236 V12.1.0, "3rd Generation Partnership Project; Technical Specification Group Services and System Aspects; Single Radio Voice Call Continuity (SRVCC); Stage 2," (Release 12), Technical Specification, (Aug. 2014) 71 pages, publisher 3GPP, Sophia Antipolis Valbonne—France.

*Primary Examiner* — Jean A Gelin

(57) ABSTRACT

The disclosure relates to a 5G or a pre-5G communication system which will be provided to support a higher data transmission rate after a 4G communication system such as LTE. The present invention provides a method for providing a service by a target base station in a wireless communication system, the method comprising: when the target base station supports an on-going service, which is the same service as a service currently received by a terminal from a source base station, transmitting, to a base station server, a service registration update request message requesting a re-establishment of a first bearer provided between the source base station and the base station server connected to
(Continued)

the source base station; receiving, from the base station server, a service registration update response message indicating that the re-establishment of the first bearer is accepted; and receiving data related to a service, provided from the base station server, through the first bearer re-established between the target base station and the base station server, and transmitting the data to the terminal.

20 Claims, 25 Drawing Sheets

(51) Int. Cl.
    *H04W 36/08*     (2009.01)
    *H04W 92/20*     (2009.01)
    *H04W 60/06*     (2009.01)

(52) U.S. Cl.
    CPC ........... *H04W 60/06* (2013.01); *H04W 76/10* (2018.02); *H04W 92/20* (2013.01); *H04W 36/0061* (2013.01); *H04W 36/0083* (2013.01)

(56) References Cited

U.S. PATENT DOCUMENTS

| | | | |
|---|---|---|---|
| 7,751,803 B2* | 7/2010 | Vialen | H04W 76/028 370/280 |
| 9,210,956 B2* | 12/2015 | Bolt | A41C 3/005 |
| 9,686,654 B2* | 6/2017 | Sayeed | H04W 4/06 |
| 2003/0193924 A1* | 10/2003 | Gehring | H04L 1/1621 370/345 |
| 2004/0109425 A1 | 6/2004 | Scribano et al. | |
| 2008/0212764 A1* | 9/2008 | Fukuta | H04L 12/66 379/211.02 |
| 2008/0232306 A1* | 9/2008 | Kopplin | H04W 76/19 370/328 |
| 2008/0254800 A1* | 10/2008 | Chun | H04W 48/12 455/438 |
| 2010/0080116 A1* | 4/2010 | Agashe | H04W 36/08 370/216 |
| 2010/0182963 A1* | 7/2010 | Fischer | H04W 48/18 370/329 |
| 2011/0276699 A1* | 11/2011 | Pedersen | H04L 45/24 709/227 |
| 2012/0120789 A1* | 5/2012 | Ramachandran | H04W 36/0022 370/220 |
| 2013/0034057 A1* | 2/2013 | Aramoto | H04W 36/0011 370/328 |
| 2013/0051338 A1* | 2/2013 | Ryu | H04W 4/005 370/329 |
| 2013/0142052 A1* | 6/2013 | Burbidge | H04W 76/028 370/242 |
| 2013/0229929 A1* | 9/2013 | Linsky | H04W 8/18 370/252 |
| 2014/0029534 A1 | 1/2014 | De Pasquale et al. | |
| 2014/0064249 A1 | 3/2014 | Lee et al. | |
| 2014/0112236 A1* | 4/2014 | Jung | H04W 76/002 370/312 |
| 2016/0021580 A1* | 1/2016 | Mufti | H04W 36/0022 370/221 |
| 2016/0066189 A1* | 3/2016 | Mahaffey | G06F 21/316 455/405 |
| 2016/0269952 A1* | 9/2016 | Moon | H04W 36/0055 |
| 2017/0238149 A1* | 8/2017 | Xu | H04W 4/06 370/312 |

FOREIGN PATENT DOCUMENTS

| | | |
|---|---|---|
| KR | 10-2012-0122335 A | 11/2012 |
| KR | 10-2014-0031630 A | 3/2014 |

* cited by examiner

DEVICE AND METHOD FOR MAINTAINING SERVICE CONNECTION BY TERMINAL IN WIRELESS COMMUNICATION SYSTEM

TECHNICAL FIELD

The present disclosure relates to a device and method for maintaining a service connection, by a terminal in a wireless communication system.

BACKGROUND ART

In order to meet wireless data traffic demands that have increased after the commercialization of 4th Generation (4G) communication system, efforts to develop an improved 5th Generation (5G) communication system or a pre-5G communication system have been made. For this reason, a 5G communication system or a pre-5G communication system is referred to as a beyond 4G network communication system or a post long term evolution (LTE) system.

In order to achieve a high data transmission rate, implementation of the 5G communication system in an ultra-high frequency (mmWave) band (for example, 60 GHz band) is being considered. In the 5G communication system, technologies such as beamforming, massive Multi-Input Multi-Output (massive MIMO), Full Dimensional MIMO (FD-MIMO), an array antenna, analog beam-forming, and a large scale antenna are discussed in order to mitigate a propagation path loss in the mmWave band and increase a propagation transmission distance.

Further, technologies such as an evolved small cell, an advanced small cell, a cloud Radio Access Network (cloud RAN), an ultra-dense network, Device to Device communication (D2D), a wireless backhaul, a moving network, cooperative communication, Coordinated Multi-Points (CoMP), and interference cancellation have been developed to improve the system network in the 5G communication system.

In addition, the 5G system has developed Advanced Coding Modulation (ACM) schemes such as hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, communication systems are continuously under development with the aim of improving throughput, and latency functions as a very important variable in improving throughput.

In the next generation communication system, an ultra-realistic service is under discussion, and a very short latency is required in the ultra-realistic service. As an example of the latency required in the ultra-realistic service, the latency required for a sense of pain is 1 second, the latency required for an auditory sense is 100 milliseconds, the latency required for vision is 10 milliseconds, and the latency required for a tactile sense is 1 millisecond. In the next generation communication system, a data rate is expected to increase sharply.

In most cases, a transmission control protocol (TCP) is used as a transmission layer between a terminal and a server providing a service to the terminal. However, the TCP has a limitation in reducing the latency due to the characteristics of the TCP itself. For example, assuming that TCP uses a window scheme for a flow control, the terminal transmits data corresponding to a predetermined window size and also gradually increases the size of data to be transmitted as the window size increases. However, when the transmitted data is corrupted or an error occurs, the TCP halves the window size to control the data rate, so as to increase the latency of the transmission layer.

Therefore, it is important to reduce the latency of the transmission layer in order to satisfy the latency required in the next generation communication system, and studies on reducing the latency of the transmission layer are needed.

DETAILED DESCRIPTION OF THE INVENTION

Technical Problem

An embodiment of the present disclosure proposes a device and method for maintaining, by a terminal, a service connection in a wireless communication system.

In addition, an embodiment of the present disclosure proposes a device and method for maintaining, by a terminal, a service connection at the time of a handover in a wireless communication system.

In addition, an embodiment of the present disclosure proposes a device and method for maintaining, by a terminal, a service connection with a base station server or an Internet server providing the same service as the base station server at the time of a handover in a wireless communication system.

Technical Solution

A method proposed in an embodiment of the present disclosure relates to a method for providing a service by a target base station in a wireless communication system, the method including: when a terminal supports an on-going service that is the same service as that currently provided by a source base station, transmitting, by the target base station, a service registration update request message for requesting re-establishment of a first bearer provided between the source base station and a base station server connected with the source base station; receiving, from the base station server, a service registration update response message for indicating that the re-establishment of the first bearer is accepted; and receiving data associated with a service provided from the base station server and transmitting the same to the terminal, through the first bearer re-established between the target base station and the base station server.

A method proposed in another embodiment of the present disclosure relates to a method for providing a service by a source base station in a wireless communication system, the method including: selecting, by a terminal, a target base station to which a handover is performed and checking whether the target base station supports an on-going service that is the same service as that provided to the terminal by the source base station; when the target base station does not support the on-going service, checking whether the target base station is a legacy base station that receives a service provided from an Internet server; and when the target base station is the legacy base station, transmitting, to the target base station, information associated with a general context used for receiving data associated with a service provided from the Internet server.

A method proposed in another embodiment of the present disclosure relates to a method for receiving a service by a terminal in a wireless communication system, the method including: when a handover command message including information associated with a target base station for a handover is received from a source base station, performing a handover to the target base station; and when the target base station supports an on-going service that is the same service as that provided by the source base station, receiving data associated with a service provided from a base station server through a first bearer re-established between the target base station and the base station server connected with the target base station.

A device proposed in an embodiment of the present disclosure relates to a target base station that provides a service in a wireless communication system, the target base station including: a transmission unit configured to, when the target base station supports an on-going service that is the same service as that currently provided by a terminal from a source base station, transmit a service registration update request message for requesting re-establishment of a first bearer provided between the source base station and a base station server connected with the source base station, and receive data associated with a service provided from the base station server so as to transmit the same to the terminal, through the first bearer re-established between the target base station and the base station server; and a reception unit configured to receive, from the base station server, a service registration update response message for indicating that re-establishment of the first bearer is accepted. A device proposed in another embodiment of the present disclosure relates to a source base station that provides a service in a wireless communication system, the source base station including: a control unit configured to, when a terminal selects a target base station for a handover and checks whether the target base station supports an on-going service that is the same service as that provided to the terminal by the source base station and the target base station does not support the on-going service, check whether the target base station is a legacy base station that receives a service provided from an Internet server, and a transmitting unit configured to transmit, to the target base station, information associated with a general context used for receiving data associated with a service provided from the Internet server when the target base station is the legacy base station.

A device proposed in another embodiment of the present disclosure relates to a terminal that receives a service in a wireless communication system, the terminal including: a control unit configured to, when a handover command message including information associated with a target base station for a handover is received from a source base station, perform a handover to the target base station; and a reception unit configured to, when the target base station supports an on-going service that is the same service as that provided by the source base station, receive data associated with a service provided from the base station server through a first bearer re-established between the target base station and the base station server.

Other aspects, gains, and core features of the present disclosure are processed with additional drawings, and they are apparent to those skilled in the art from the following detailed description including exemplary embodiments of the present disclosure.

The terms "include", "comprise", and derivatives thereof may mean inclusion without limitation, the term "or" may have an inclusive meaning and means "and/or", the phrases "associated with", "associated therewith", and derivatives thereof may mean to include, be included within, interconnect with, contain, be contained within, connected to or with, coupled to or with, be communicable with, cooperate with, interleave, juxtapose, be proximate to, be bound to or with, have, and have a property of, the term "controller" may mean any device, system, or a part thereof that controls at least one operation, and such a device may be implemented in hardware, firmware, or software, or some combinations of at least two of the same. It should be noted that the functionality associated with any particular controller may be centralized or distributed, whether locally or remotely. Definitions for certain words and phrases are provided throughout this patent document, those skilled in the art should understand that in many, if not most instances, such definitions apply to prior, as well as future uses of such defined words and phrases.

Advantageous Effects

The present disclosure can minimize a transmission latency generated in a transmission layer by providing, through an access layer, a service connection that has been provided through the transmission layer. In addition, the present disclosure can improve the user's perceived quality of a service by maintaining the service connection when a terminal performs a handover in a system to which the service connection is provided through the access layer.

MODE FOR CARRYING OUT THE INVENTION

Figure 1:
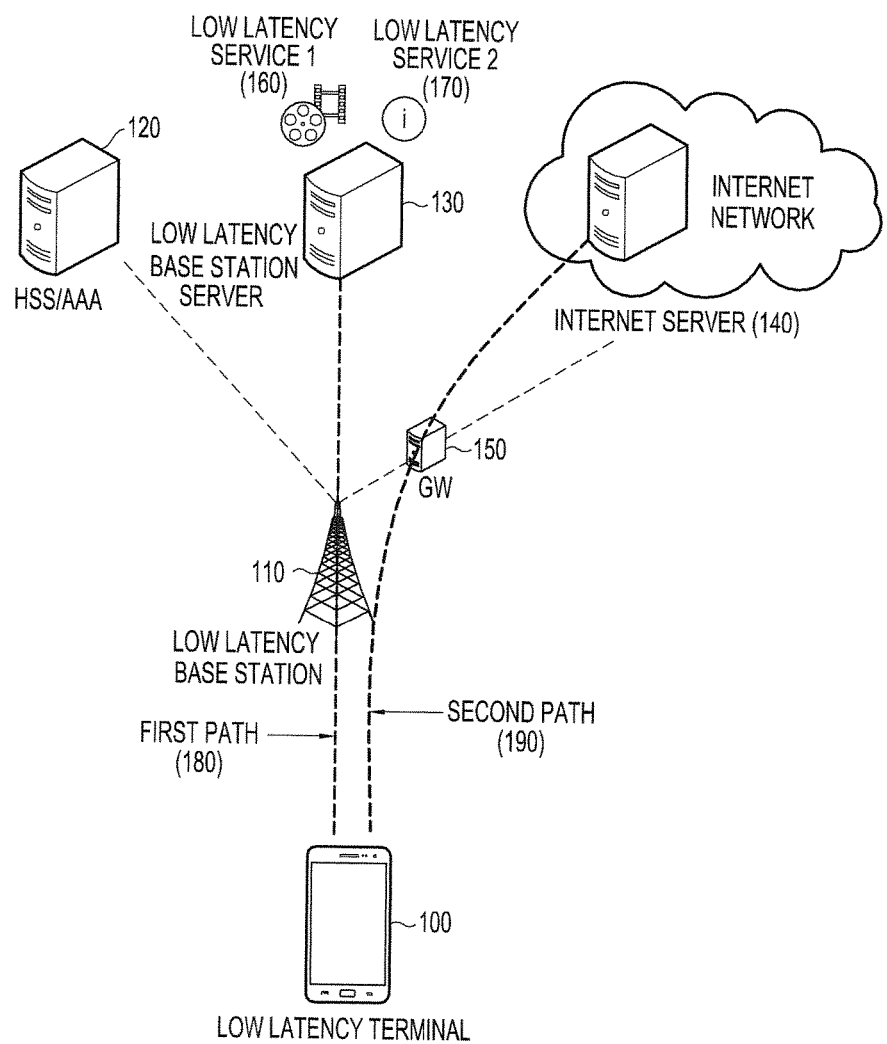
FIG. 1 is a diagram illustrating an example of a low latency providing system structure according to an embodiment of the present disclosure.

Hereinafter, exemplary embodiments of the present disclosure will be described in detail with reference to the accompanying drawings. Further, in the following description of the present disclosure, a detailed description of known functions and configurations incorporated herein will be omitted when it may make the subject matter of the present disclosure rather unclear. The terms that will be described below are terms defined in consideration of the functions in the present disclosure, and may be different according to users, intentions of the users, or customs. Therefore, the definitions of the terms should be made based on the contents throughout the specification.

The present disclosure may have various modifications and various embodiments, among which specific embodiments will now be described more fully with reference to the accompanying drawings. However, it should be understood that the present disclosure is not limited to the specific embodiments, but the present disclosure includes all modifications, equivalents, and alternatives within the spirit and the scope of the present disclosure.

Further, it will be appreciated that singular expressions such as "an" and "the" include plural expressions as well, unless the context clearly indicates otherwise. Accordingly, as an example, a "component surface" includes one or more component surfaces.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

The terms used herein are used only to describe particular embodiments, and are not intended to limit the present disclosure. As used herein, the singular forms are intended to include the plural forms as well, unless the context clearly indicates otherwise. In the present disclosure, the terms such as "include" and/or "have" may be construed to denote a certain characteristic, number, step, operation, constituent element, component or a combination thereof, but may not be construed to exclude the existence or a possibility of addition of one or more other characteristics, numbers, steps, operations, constituent elements, components or combinations thereof.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present specification.

According to various embodiments of the present disclosure, an electronic device may include a communication functionality. The terminal may, for example, be a smart phone, a tablet personal computer (PC), a mobile phone, a video phone, an e-book reader, a desktop PC, a laptop PC, a netbook PC, a personal digital assistant (PDA), a portable multimedia player (PMP), an MP3 player, a mobile medical device, a camera, or a wearable device (e.g., head-mounted device (HMD), electronic clothes, an electronic bracelet, an electronic necklace, an electronic appcessory, an electronic tattoo, or a smart watch).

According to various embodiments of the present disclosure, the electronic device may be a smart home appliance with a communication function. The smart home appliance may, for example, be a television, a digital video disk (DVD) player, an audio player, a refrigerator, an air conditioner, a vacuum cleaner, an oven, a microwave, a washer, a drier, an air purifier, a set-top box, a TV box (e.g., Samsung HomeSync™, Apple TV™, or Google TV™), a gaming console, an electronic dictionary, a camcorder, or an electronic photo frame.

According to various embodiments of the present disclosure, the electronic device may be a medical appliance (e.g., magnetic resonance angiography (MRA) device, magnetic resonance imaging (MRI) device, computed tomography (CT) device, and ultrasonic device), a navigation device, a global positioning system (GPS) receiver, an event data recorder (EDR), a flight data recorder (FDR), an automotive infotainment device, a marine electronic device (e.g., ship navigation device and a gyrocompass), avionics, security equipment, or an industrial or home robot.

According to various embodiments of the present disclosure, the electronic device may be a part of furniture or a building/structure, an electronic board, an electronic signature receiving device, a projector, and various kinds of measuring instruments (e.g., water meter, electric meter, gas meter, and electromagnetic wave meter), each of which has a communication functionality.

According to various embodiments of the present disclosure, the electronic device may be a combination of the above-mentioned devices. Further, it will be apparent to those skilled in the art that the terminal according to various embodiments of the present disclosure is not limited to the above-mentioned devices.

Meanwhile, a method and device proposed in an embodiment of the present disclosure may be applicable to an IEEE 802.11 communication system, an IEEE 802.16 communication system, a mobile broadcasting service such as a Digital Multimedia Broadcasting (DMB) service, a Digital Video Broadcasting-Handheld (DVP-H), and Advanced Television Systems Committee-Mobile/Handheld (ATSC-M/H) services, a digital video broadcasting system such as an Internet Protocol Television (IPTV), an Moving Picture Experts Group (MPEG) media transport (MMT) system, an Evolved Packet System (EPS), and various communication systems including an LTE communication system, an LTE-Advanced (LTE-A) communication system, a High-Speed Downlink Packet Access (HSDPA) mobile communication system, a High-Speed Uplink Packet Access (HSUPA) mobile communication system, a High Rate Packet Data (HRPD) mobile communication system of 3rd Generation Project Partnership 2 (3GPP2), a Wideband Code Division Multiple Access (WCDMA) mobile communication system of 3GPP2, a Code Division Multiple Access (CDMA) mobile communication system of 3GPP2, a Mobile Internet Protocol (Mobile IP), and the like.

In an embodiment of the present disclosure to be described later, a low latency providing system that directly provides service connection setup of a terminal and a server in an access layer without using a transmission layer protocol (e.g., a TCP/IP), which generates a connection latency, and a method for maintaining a service connection at the time of a handover of a terminal in the low latency providing system will be described in more detail. The low latency providing system refers to a system that directly provides service connection setup of a terminal and a server in an access layer so as to minimize a connection latency generated in a transmission layer.

Although an Evolved Packet System (EPS) will be the main object in describing embodiments of the present disclosure in detail, the main point of the present disclosure may be applicable to other communication systems having similar technical backgrounds by slight modification of the present disclosure within the range thereof, and this may be available by a determination of those skilled in the art.

FIG. 1 is a diagram illustrating an example of a low latency providing system structure according to an embodiment of the present disclosure.

Referring to FIG. 1, the illustrated low latency providing system mainly includes a low latency terminal 100 and a low latency network. The low latency network provides low latency service 1 160 and low latency service 2 170 to the low latency terminal 100. In addition, the low latency network includes a low latency base station 110, a home subscriber server (HSS)/authentication•authorization•accounting (AAA) 120, a low latency base station server 130, an Internet server 140, and a gateway (GW) 150, in which the Internet server 140 is connected to the low latency base station 110 via the GW 150.

The low latency terminal 100 supports a low latency protocol used in the low latency providing system, and receives, from the low latency base station server 130, a low latency service, e.g., low latency service 1 160 and low latency service 2 170 by using the low latency protocol. The low latency service may be a service specialized for each mobile network operator (MNO), an Internet service provided from a content provider who has a service level agreement (SLA) with the MNO, or the like. Further, the low latency service may be different for each low latency base station supporting the low latency service. For example, a latency-based streaming service is different for each base station supporting the streaming service.

The low latency base station 110 supports a low latency protocol and performs a service connection function, a session management function, an Internet bearer connection function, and the like. In addition, the low latency base station 110 may support a plurality of connection networks. For example, the low latency base station 110 may support a 5G network, an LTE network, and the like. In this case, a bearer associated with low latency communication may be connected through a 5G network and an Internet bearer may be connected through an LTE network.

The low latency base station server 130 is connected with the low latency base station 110 and provides a low latency service to the low latency terminal 100 through the low latency base station 110. The low latency base station server 130 may provide one or more low latency services to the low latency terminal 100.

The HSS/AAA 120 is connected with the low latency base station 110, performs authentication for the low latency terminal 100 through the low latency base station 110, and manages subscription information of the low latency terminal 100, etc. Here, the subscription information may include, for example, a list of low latency services subscribed by the low latency terminal 100, the quality of service (QoS) subscribed by the low latency terminal 100 for each of the low latency services, names of respective low latency services, category names referring to a plurality of low latency services, and the like.

A service requested by the low latency terminal 100 in the illustrated low latency providing system is provided as follows. The low latency terminal 100 makes a request for a service to the low latency base station 110, and the low latency base station 110 provides a low latency service to the low latency terminal 100 through the low latency base station server 130 when the service requested by the low latency terminal 100 is the low latency service supported by the low latency base station 110. That is, the low latency terminal 100 receives low latency service 1 160 and/or low latency service 2 170 through an illustrated first path 180.

However, when the service requested by the low latency terminal 100 is not the low latency service supported by the low latency base station 110, that is, when the service is a legacy service, the low latency base station 110 provides, to the low latency terminal 100, the legacy service requested by the low latency terminal 100 through the Internet server 140. That is, the low latency terminal 100 receives the legacy service through an illustrated second path 190.

Figure 2A:
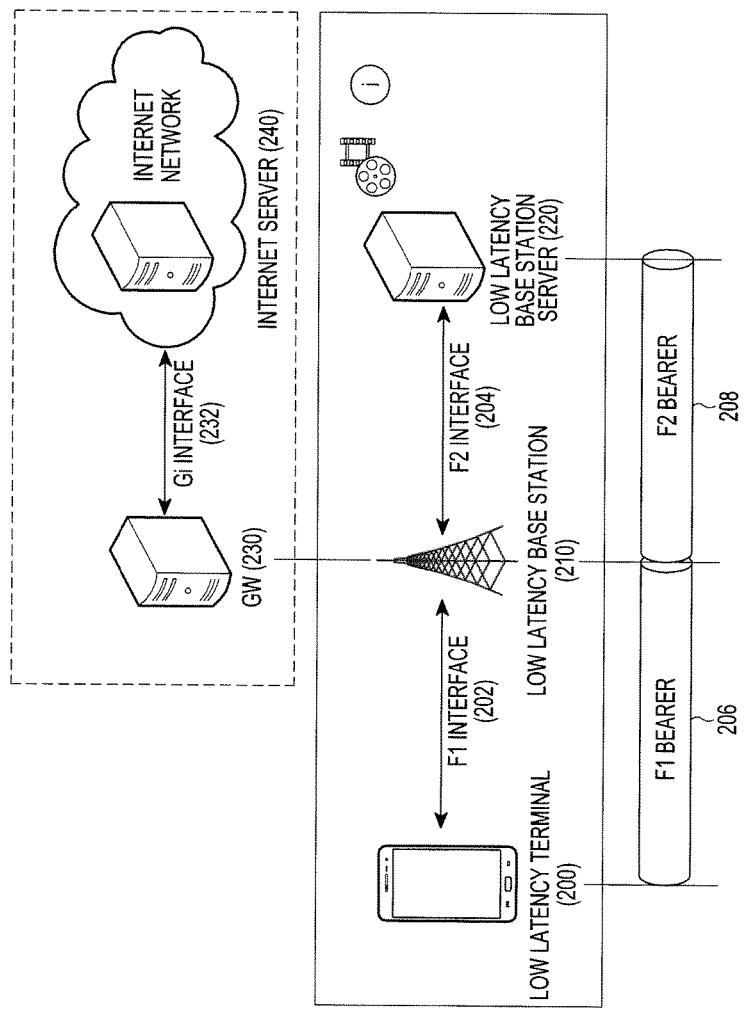
FIG. 2A is a diagram illustrating an example of structures of an interface and a bearer, which are established between elements in a low latency providing system according to an embodiment of the present disclosure.

FIG. 2A is a diagram illustrating an example of structures of an interface and a bearer, which are established between elements in a low latency providing system according to an embodiment of the present disclosure.

Referring to FIG. 2A, elements used for providing a low latency service in the low latency providing system are indicated by solid lines, and additional elements used for providing a legacy service are indicated by dotted lines.

A low latency terminal 200 and a low latency base station 210 which are included in the low latency providing system are connected through an f1 interface 202. The f1 interface 202 registers the low latency terminal 200 in the low latency network.

The low latency base station 210 and a low latency base station server 220 which are included in the low latency providing system are connected through an f2 interface 204. The f2 interface 204 registers the low latency terminal 200 in the low latency base station server 220, activates a low latency service, updates a context associated with the low latency service to the low latency base station server 220, and cancels the registration of the pre-registered low latency terminal 200 from the low latency base station server 220. Here, activating of the low latency service may be, for example, a function capable of providing streaming data to the low latency terminal 200.

An F1 bearer 206 (i.e., a radio bearer) is provided between the low latency terminal 200 and the low latency base station 210, and an F2 bearer 208 (i.e., a core bearer) is provided between the low latency base station 210 and the low latency base station server 220.

A GW 230 and an Internet server 240, which are included in a legacy system providing a legacy service, are connected through a Gi interface 232. The GW 230 may be directly connected with the low latency base station 210, and the GW 230 allocates an IP address to the low latency terminal 200 such that the low latency terminal 200 may be connected to an Internet network. In an LTE communication system, a Packet Data Network Gateway (PGW: Packet Data Network (PDN) gateway) may function in the same way as that of the GW 230.

Figure 2B:
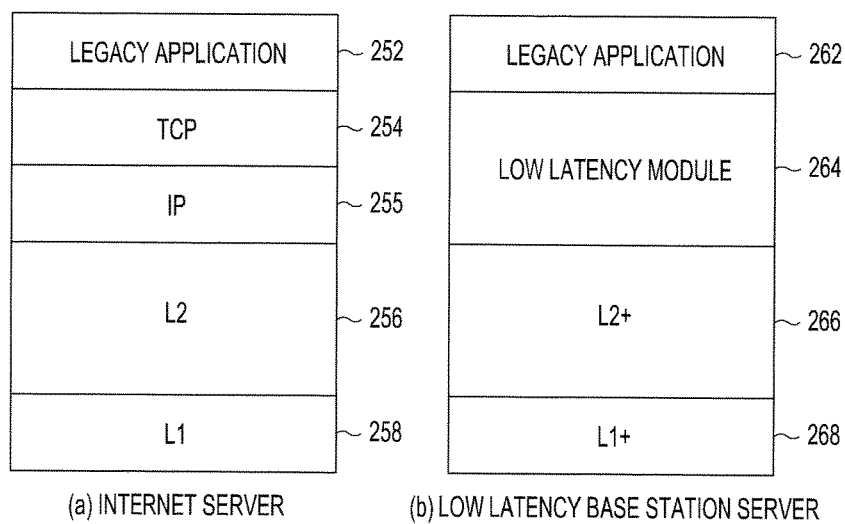
FIG. 2B is a drawing illustrating an example of a protocol stack used by an Internet server and a low latency base station server in a low latency providing system according to an embodiment of the present disclosure.

FIG. 2B is a drawing illustrating an example of a protocol stack used by an Internet server and a low latency base station server in a low latency providing system according to an embodiment of the present disclosure.

Referring to FIG. 2B, (A) illustrates a protocol stack used by the Internet server 240, and (B) illustrates a protocol stack used by the low latency base station server 220.

Protocol stack (A) used by the Internet server 240 includes a legacy application layer 252, a TCP layer 254, an IP layer 255, a layer 2 (L2) layer 256, and a layer 1 (L1) layer 258.

The legacy application layer 252 performs the same function as that of an application layer used by a legacy terminal, and even the low latency terminal 200 may use the legacy application layer 252.

The TCP layer 254 and the IP layer 255 operate as transmission layers and, for example, transmit a request received from the legacy application layer 252 to the L2 layer 256.

The L2 layer 256 operates as a data link layer and, for example, controls data transmission and detects an error of data.

The L1 layer 258 operates as a physical layer and, for example, performs a radio access function based on 5G, LTE, Wireless-Fidelity (Wi-Fi), and the like.

Protocol stack (B) used by the low latency base station server 220 includes a legacy application layer 262, a low latency module 264, a layer 2+ (L2+) layer 266, and a layer 1+ (L1+) layer 268.

The legacy application layer 262 performs the same function as that of an application layer used by a legacy terminal, and even the low latency terminal 200 may use the legacy application layer 262.

However, in order for the low latency terminal 200 to use the application layer used by the legacy terminal, the low latency module 264 enabling communication with the L2+ layer 266 that is a low latency access layer is required.

The low latency module 264 functions to enable communication between the legacy application layer 262 and the L2+ layer 266. That is, the low latency module 264 transmits a request of the legacy application layer 262 to the L2+ layer 262, and transmits a request of the L2+ layer 266 to the legacy application layer 262. In addition, the low latency module 264 determines whether to operate in a low latency mode to provide a low latency service or operate in a legacy mode to provide a legacy service. The low latency module 264 operates transparently to the legacy application layer 262 and, for example, the legacy application layer 262 recognizes the low latency module 264 as an Operating System (OS: operation system) of the terminal.

The L2+ layer 266 performs the same function as the existing L2 layer. FIGS. 2A and 2B, describes an example of a configuration in which the low latency base station 210 communicates with the low latency base station server 220 through the L2+ layer 266. However, the L2+ layer 266 may be replaced with an L2* layer or the existing L2 layer. Here, the L2* layer is a low latency access layer and refers to a layer that manages a service communication between the low latency terminal and the low latency base station server.

The L1+ layer 268 functions as a physical layer and performs a radio access function.

Accordingly, in the low latency providing system, the low latency base station providing a low latency service and the legacy base station providing a legacy service may coexist, and the low latency service is provided through the illustrated protocol stack (B), and the legacy service is provided through the illustrated protocol stack (A).

FIG. 2B describes an example of a configuration in which the low latency base station server 220 receives data associated with the low latency service using protocol stack (B). However, the low latency base station server 220 may optionally receive data associated with the service using protocol stack (A).

Meanwhile, the low latency terminal 200 that has been receiving the low latency service from the low latency base station server 220 may move to a communication area of the legacy base station from a communication area of the low latency base station 210, in which the low latency service having been provided to the low latency terminal 200 may be stopped.

In addition, since the low latency terminal 200 performs a handover in consideration of only the strength of a reception signal, although a low latency base station providing a low latency service is present in an area to which the low latency terminal 200 has moved, the low latency terminal 200 performs a handover to a legacy base station when the strength of a reception signal received from the legacy base station is greater than the strength of a reception signal received from the low latency base station. Therefore, the low latency terminal 200 that has performed a handover to the legacy base station is disconnected during a call, etc., thereby degrading the quality of experience (QoE) of a user.

In an embodiment of the present disclosure to be described later, a method for maintaining a service connection when a low latency terminal that has been receiving a low latency service from a low latency base station moves out of a communication area of the low latency base station will be described.

In addition, an embodiment of the present disclosure to be described later describes an example of a method for maintaining a service connection when a low latency terminal performs a handover in the low latency providing system described in FIG. 1. However, a method for maintaining a service connection in an embodiment of the present disclosure may be equally applied to any system in which a source base station and a target base station use different transmission protocols.

Figure 3:
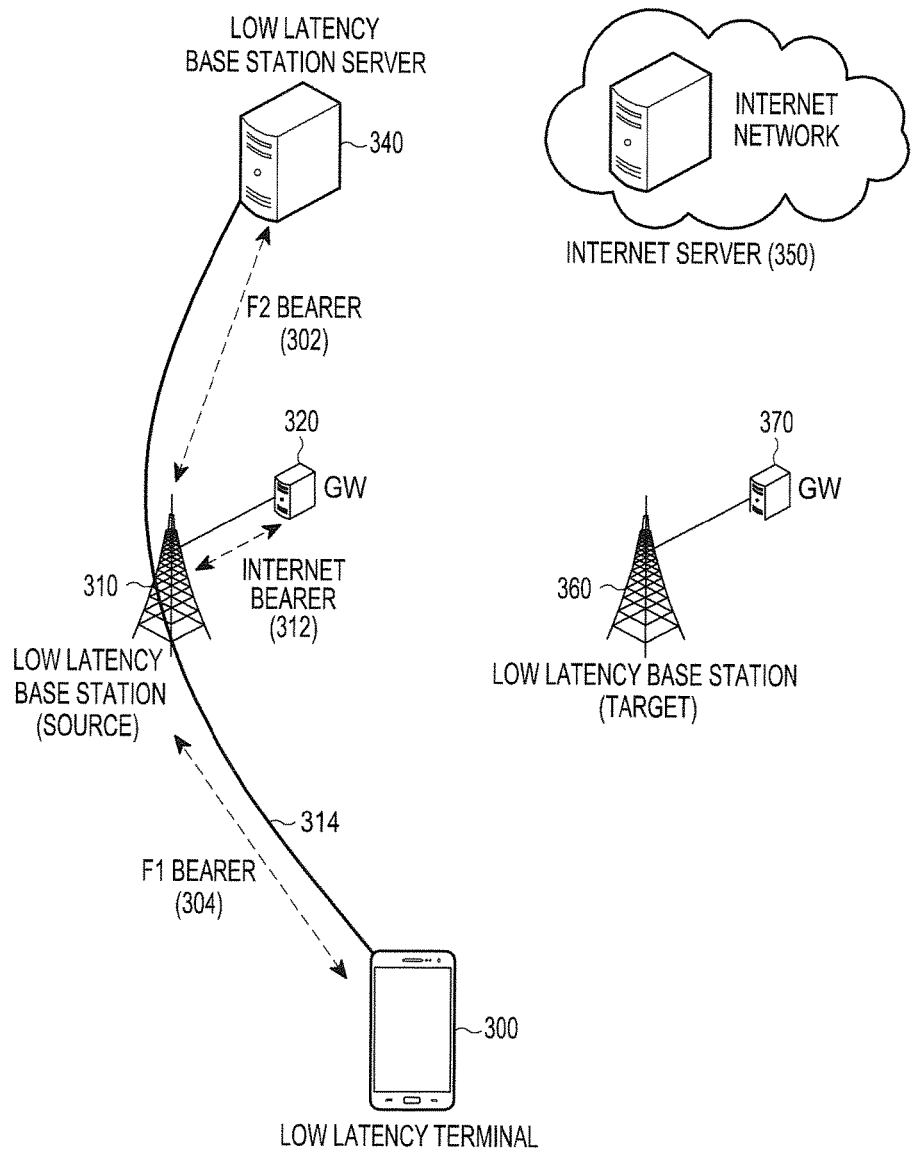
FIG. 3 is a diagram illustrating an example in which a low latency terminal receives data associated with a low latency service from a low latency base station server in a low latency providing system according to an embodiment of the present disclosure.

FIG. 3 is a diagram illustrating an example in which a low latency terminal receives data associated with a low latency service from a low latency base station server in a low latency providing system according to an embodiment of the present disclosure.

Referring to FIG. 3, the illustrated low latency providing system mainly includes a low latency terminal 300 and a low latency network, and the low latency network provides a low latency service to the low latency terminal 300. In addition, the low latency network includes a low latency base station server 340, an Internet server 350, a low latency base station 310 that is a source base station, a GW 320 connected to the low latency base station 310, a low latency base station 360 that is a target base station, and a GW 370 connected to the low latency base station 360. The source base station refers to a base station that currently provides a service to the low latency terminal 300, and the target base station refers to a base station to which the low latency terminal 300 performs a handover.

An F1 bearer 304 that is a radio bearer is provided between the low latency terminal 300 and the low latency base station 310, and an F2 bearer 302 that is a core bearer is provided between the low latency base station 310 and the low latency base station server 340. That is, the low latency terminal 300 sets up a service connection with the low latency base station server 340 through the F1 bearer 304 and the F2 bearer 302, and receives data associated with the low latency service provided from the low latency base station server 340.

Figure 4:
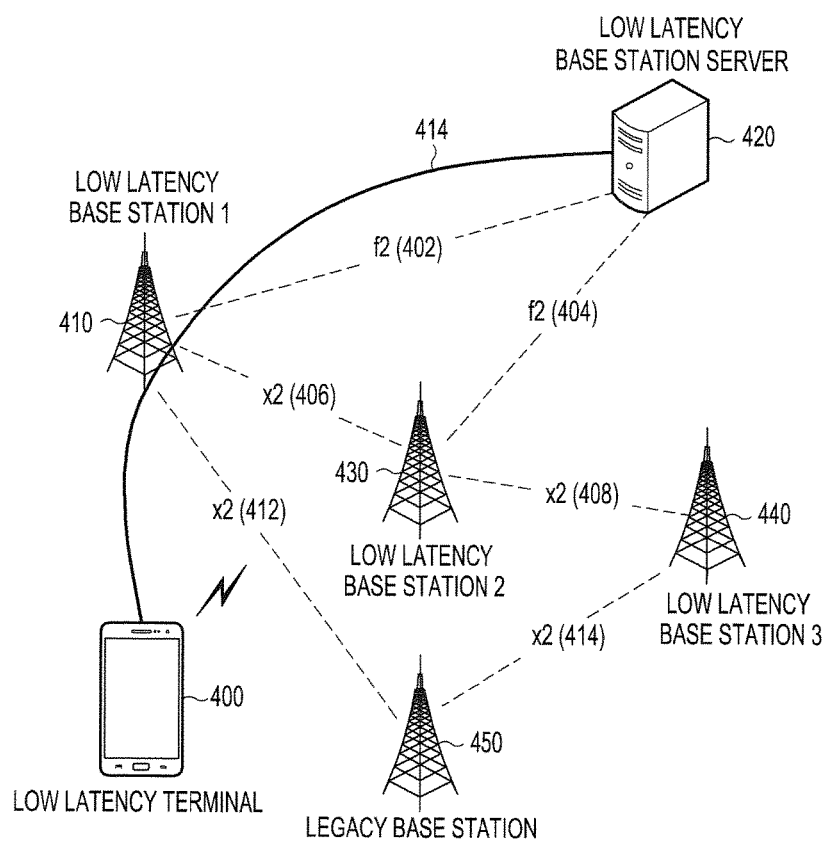
FIG. 4 is a diagram illustrating an example in which a low latency base station and a legacy base station are arranged in a low latency providing system according to an embodiment of the present disclosure.

FIG. 4 is a diagram illustrating an example in which a low latency base station and a legacy base station are arranged in a low latency providing system according to an embodiment of the present disclosure.

Referring to FIG. 4, it is assumed that the illustrated low latency providing system includes a low latency terminal 400, low latency base station 1 410, a low latency base station server 420, low latency base station 2 430, low latency base station 3 440, and a legacy base station 450.

A service connection may or may not be set up in the low latency base station and a specific low latency base station server. For example, a service connection is set up in low latency base station 1 410 and low latency base station 2 430, but a service connection is not set up in low latency base station 3 440 and the low latency base station server 420.

In addition, low latency base stations 410, 430, and 440 and the legacy base station 450 may coexist.

Each of low latency base stations 1 410 and low latency base station 2 430 is connected with the base station service 420 through an F2 interface, and base stations 410, 430, 440, and 450 are connected to each other through an x2 interface. The embodiment of the present disclosure has described an example in which base stations 410, 430, 440, and 450 are connected to each other through an x2 interface. However, the base stations 410, 430, 440, and 450 may be connected through other interfaces, and each of low latency base stations 1 410 and low latency base station 2 430 may be connected with the legacy base station 450 through an x2 interface or other interfaces.

The low latency terminal 400 may receive data associated with a low latency service through low latency base station 1 410 or low latency base station 2 430, in which a service connection with the low latency base station server 420 is set up. In FIG. 4, it is assumed that the low latency terminal 400 receives data associated with a low latency service through an illustrated path 414.

Meanwhile, the low latency terminal 400 measures a signal strength for neighboring base stations 410, 430, 440, and 450 and configures a measurement report including information on a neighboring cell and/or a neighboring base station, which are capable of a handover based on the measured signal strength, so as to transmit the same to low latency base station 1 410. Configuration and transmission of the measurement report may be performed periodically or when a specific event occurs.

In the embodiment of the present disclosure, a base station providing a service to the current terminal 400, like low latency base station 1 410, is referred to as a source base station and/or a serving base station.

Low latency base station 1 410 selects a target base station to which the low latency terminal 400 performs a handover based on the measurement report received from the low latency terminal 400. That is, low latency base station 1 410 determines whether each of base stations that are included in the measurement report and capable of a handover supports the low latency service, and selects a target base station among the base stations capable of a handover in consideration of the determination. Hereinafter, a low latency service currently provided from the source base station before the low latency terminal performs a handover is referred to as an on-going low latency service.

Figure 5:
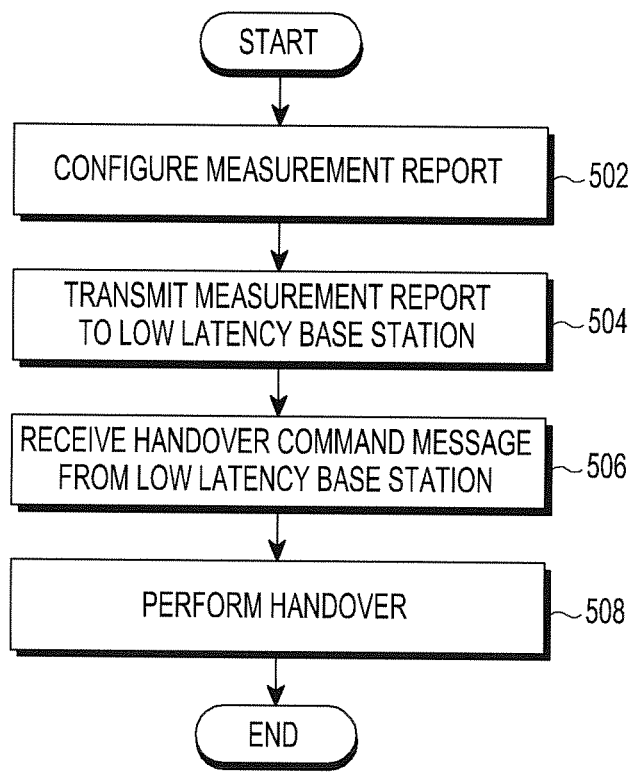
FIG. 5 is a flowchart illustrating an example of a procedure for performing a handover by a low latency terminal in a low latency providing system according to an embodiment of the present disclosure.

FIG. 5 is a flowchart illustrating an example of a procedure for performing a handover by a low latency terminal in a low latency providing system according to an embodiment of the present disclosure.

Referring to FIG. 5, in step 502, a low latency terminal measures a signal strength for neighboring base stations, and configures, periodically or when a specific event occurs, a measurement report including information on at least one neighboring base station capable of a handover among the neighboring base stations. The at least one neighboring base station capable of a handover is determined based on the signal strength for the neighboring base stations, and the low latency terminal, for example, may determine, as a base station capable of a handover, a neighboring base station having the measured signal strength equal to or greater than a predetermined threshold value.

In step 504, the low latency terminal transmits the configured measurement report to the low latency base station.

Here, it is assumed that the low latency base station is a serving base station that has been providing a low latency service to the low latency terminal.

In step 506, the low latency terminal receives a handover command message that commands to perform a handover to a predetermined target base station from the low latency base station that is a serving base station. In step 508, the low latency terminal performs a handover to the target base station from the serving base station.

Figure 6:
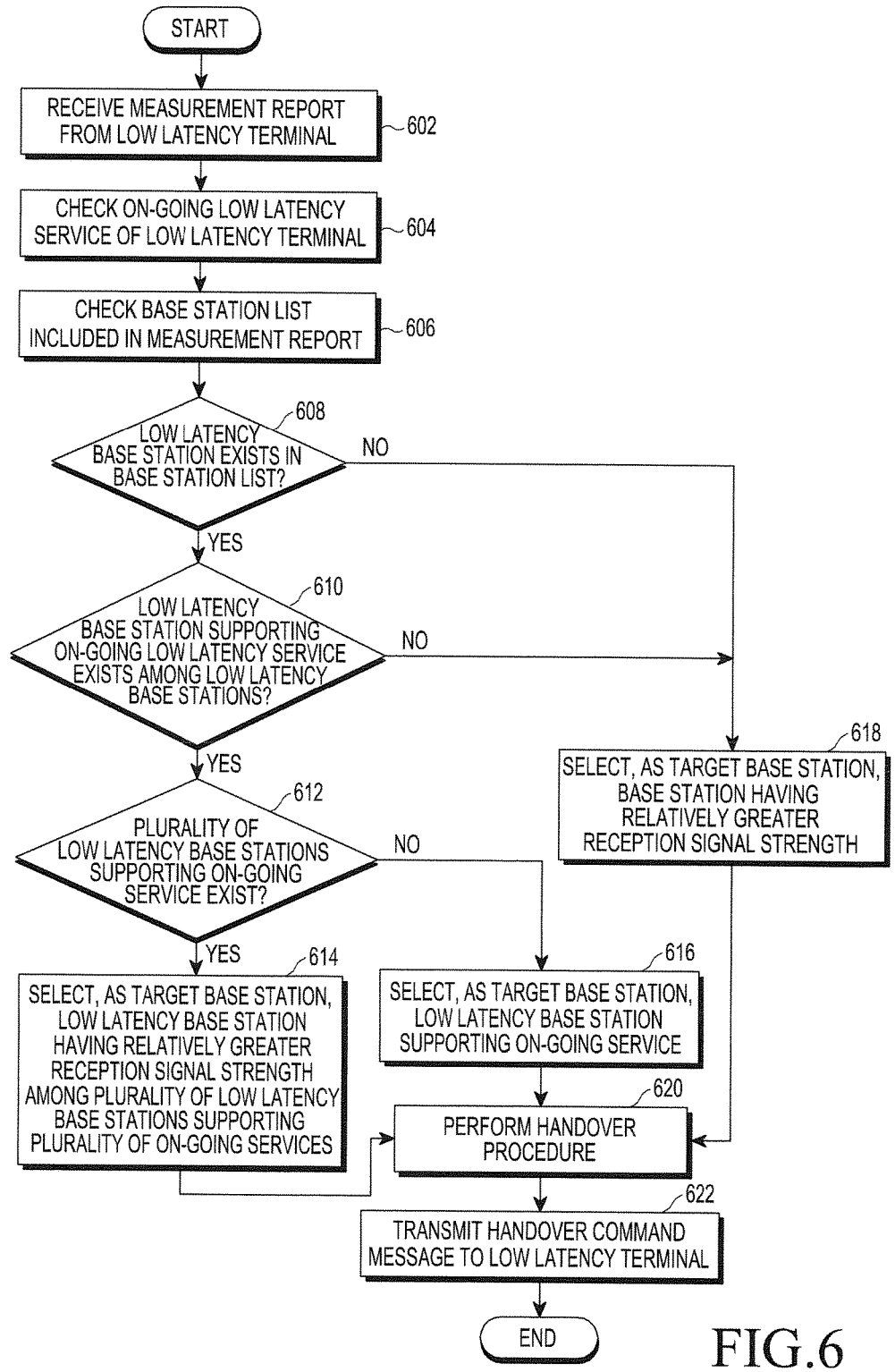
FIG. 6 is a flowchart illustrating an example of a procedure for performing a handover by a low latency base station in a low latency providing system according to an embodiment of the present disclosure.

FIG. 6 is a flowchart illustrating an example of a procedure for performing a handover by a low latency base station in a low latency providing system according to an embodiment of the present disclosure.

Referring technical FIG. 6, it is assumed that the low latency base station is a source base station and/or a serving base station, which has been providing a low latency service to a low latency terminal.

In step 602, the low latency base station receives a measurement report from the low latency terminal. The measurement report includes information on neighboring base stations to which the low latency terminal may perform a handover, for example, a base station list, a cell list, and the like.

In step 604, the low latency base station checks the low latency service (i.e., an on-going low latency service) currently provided to the low latency terminal, and proceeds to step 606 to check the base station list included in the measurement report received in step 602. FIG. 6 describes, as an example, an operation for checking the on-going low latency service and then checking the base station list included in the measurement report, by the low latency base station. However, in relation to step 604 and step 606, step 606 may be performed first and step 604 may be performed later depending on a case. That is, the base station list included in the measurement report may be checked first, and then the on-going low latency service may be checked.

In step 608, the low latency base station checks whether a low latency base station providing a low latency service is present in the base station list. When at least one low latency base station is present in the base station list as a result of the check in step 608, the low latency base station proceeds to step 610 to check whether a low latency base station supporting the on-going low latency service exists in the at least one low latency base station.

When a low latency base station supporting the on-going low latency service is present in the at least one low latency base station as a result of the check in step 610, the low latency base station proceeds to step 612 to check whether a plurality of low latency base stations supporting the on-going low latency service are present. When the plurality of low latency base stations supporting the on-going low latency service are present as a result of the check in step 612, the low latency base station proceeds to step 614 to select, as a target base station, a low latency base station having a relatively greater reception signal strength among the plurality of low latency base stations supporting the on-going low latency service.

In addition, when a plurality of low latency base stations supporting the on-going low latency service are not present as a result of the check in step 612 (that is, when one low latency base station supporting the on-going low latency service is present), the low latency base station proceeds to step 616 to select, as a target base station, the one low latency base station supporting the on-going low latency service.

Meanwhile, when a low latency base station is not present in the base station list as a result of the check in step 608 and when a low latency base station supporting the on-going low latency service is not present in the at least one low latency base station as a result of the check in step 610, the low latency base station proceeds to step 618 to select, as a target base station, a base station having a relatively greater reception signal strength among base stations included in the base station list.

Later, in step 620, the low latency base station performs a handover procedure with the selected target base station, and proceeds to step 622 to transmit, to the low latency terminal, a handover command message that indicates to perform a handover to the target base station.

FIG. 6 has described an example of selecting, by the low latency base station, a target base station to which a handover is performed, based on the base station list included in the measurement report. However, the low latency base station may select the target base station to which a handover is performed, based on a cell list instead of the base station list. In this case, the low latency base station detects a low latency cell supporting the on-going low latency service among low latency cells providing a low latency service, based on the cell list included in the measurement report and selects, as a target base station, a base station that manages the low latency cell.

Figure 7A:
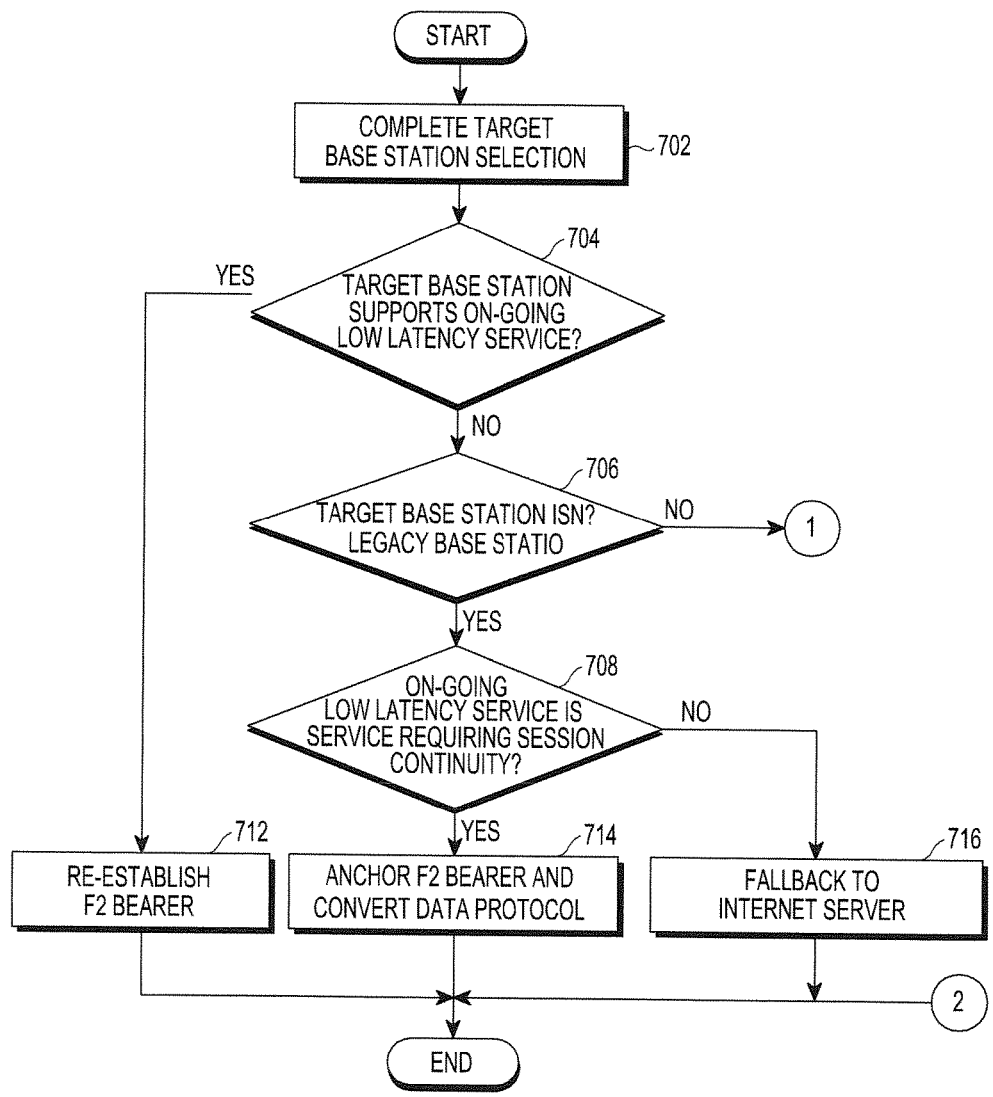
FIGS. 7A and 7B are flowcharts illustrating an example of a handover procedure for maintaining a service connection by a low latency base station in a low latency providing system according to an embodiment of the present disclosure.
Figure 7B:
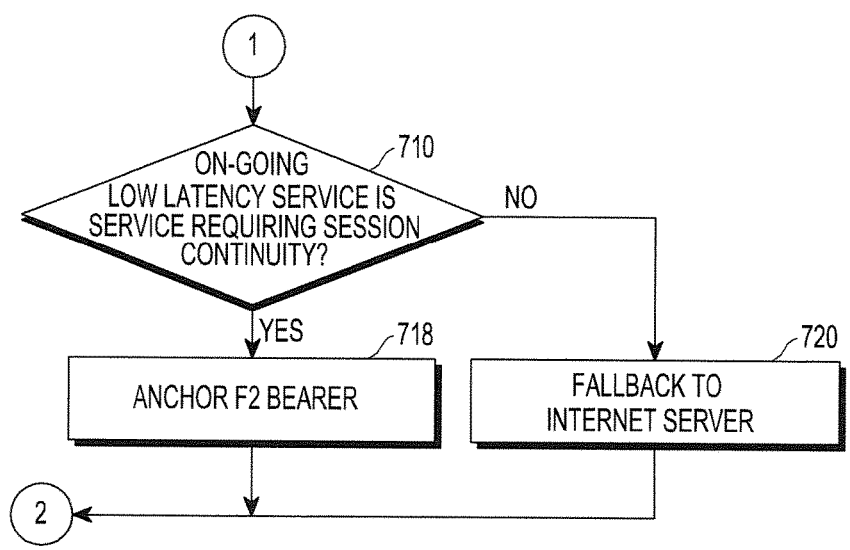

FIGS. 7A and 7B are flowcharts illustrating an example of a handover procedure for maintaining a service connection by a low latency base station in a low latency providing system according to an embodiment of the present disclosure.

Referring to FIGS. 7A and 7B, it is assumed that the low latency base station is a source base station and/or a serving base station, that has been providing the low latency service to a low latency terminal.

The low latency base station, which has selected a target base station in step 702, proceeds to step 704 to check whether the selected target base station supports an on-going low latency service. It is assumed that the target base station is selected by one of the methods among step 614, step 616, and step 618 of FIG. 6.

When the target base station supports the on-going low latency service as a result of the check in step 704, the low latency base station proceeds to step 712 to re-establish an F2 bearer in order to maintain a service connection.

However, when the target base station does not support the on-going low latency service as a result of the check in step 704, the low latency base station proceeds to step 706 to check whether the target base station is a legacy base station that does not support a low latency service. When the target base station is a legacy base station as a result of the check in step 706, the low latency base station proceeds to step 708 to check whether the on-going low latency service is a service requiring session continuity. The service requiring the session continuity refers to a service required to be provided without disconnection, and may be, for example, a video streaming service. A service that does not require session continuity may be, for example, a service to search for a web site, such as Naver, Google, and the like.

When the on-going low latency service is a service requiring session continuity as a result of the check in step 708, the low latency base station proceeds to step 714 to perform anchoring of the F2 bearer in order to maintain a service connection and converts a data protocol. However, when the on-going low latency service is not a service requiring session continuity as a result of the check in step 708, the low latency base station proceeds to step 716 to perform a fallback to the Internet server in order to maintain a service connection.

However, when the target base station is not a legacy base station as a result of the check in step 706 (that is, when the target base station is a low latency base station), the low latency base station proceeds to step 710 to check whether the on-going low latency service is a service requiring session continuity. When the on-going low latency service is a service requiring session continuity as a result of the check in 710, the low latency base station proceeds to step 718 to perform anchoring of the F2 bearer in order to maintain a service connection. However, when the on-going low latency service is not a service requiring session continuity as a result of the check in step 710, the low latency base station proceeds to step 720 to perform a fallback to the Internet server in order to maintain a service connection.

TABLE 1 describes an example of a general context used for receiving, by a terminal, data associated with a legacy service provided from an Internet server through a transmission layer protocol, and an example of a low latency context used for receiving, by a terminal, data associated with a low latency service provided from a low latency base station server through a low latency protocol. The general context is necessarily transmitted to a target base station in a handover procedure, but the low latency context is selectively transmitted to a target base station according to a type of the target base station, whether the target base station supports the low latency service, and the like.

TABLE 1

| General Context |
| --- |
| UE_ID, target cell/BS ID |
| UE security context, UE AMBR |
| (LTE) radio bearer ID, radio bearer level QoS |
| Low Latency Context |
| T_UE_ID |
| UE low latency security context |
| F1 bearer ID |
| F1 level QoS |
| F2 bearer ID |
| Registered service name |
| Session information |
| Subscription data (low latency service name, low latency service QoS) |

The general context shown in TABLE 1 includes UE_ID indicating a unique identifier (identity (ID)) of a user equipment (UE), a target cell/BS ID indicating a unique ID of a target cell/base station (BS), a UE security context, an Aggregate Maximum Bit Rate (AMBR) of the UE, a radio bearer ID, the quality of a radio bearer level service (quality of service (QoS)), and the like.

The low latency context shown in TABLE 1 includes a temporary UE ID (T_UE ID), a UE low latency security context, an F1 bearer ID, an F1 level QoS, and F2 bearer ID, a registered service name, session information, subscription data, and the like.

The T_UE_ID is an ID used, by a low latency terminal, instead of a unique ID of the terminal in a low latency providing system, and is used to identify the low latency terminal in the low latency providing system.

The UE low latency security context is information acquired in an authentication procedure performed when the low latency terminal is initially connected to the low latency providing system, and is used to maintain security by the low latency terminal connected to the low latency providing system.

The F1 bearer ID indicates an identifier of the F1 bearer provided between the low latency terminal and the low latency base station.

The F1 level QoS indicates QoS information of the F1 bearer and may include, for example, a maximum bit rate (MBR).

The F2 bearer ID indicates an identifier of the F2 bearer provided between the low latency base station and the low latency base station server.

The registered service name indicates services registered by the low latency terminal in the low latency base station that is a source base station, and a list of used services.

The session information indicates information associated with a session established in an associated bearer.

The subscription data indicates low latency service subscription information of the low latency terminal and may include, for example, a name of a low latency service to which the low latency terminal subscribes, QoS information associated with each low latency service, and the like.

Figure 8:
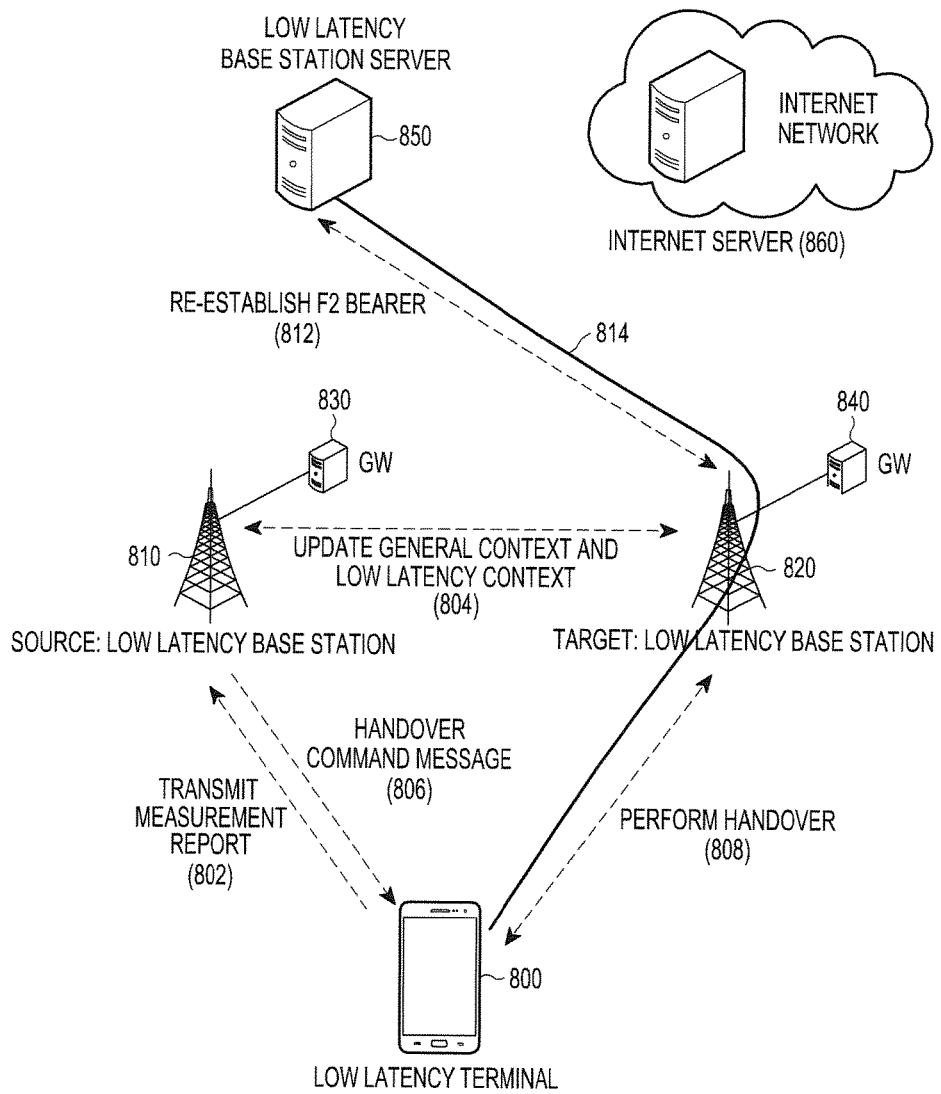
FIG. 8 is a diagram illustrating an example of performing a handover when a target base station supports an on-going low latency service in a low latency providing system according to an embodiment of the present disclosure.

FIG. 8 is a diagram illustrating an example of performing a handover when a target base station supports an on-going low latency service in a low latency providing system according to an embodiment of the present disclosure. In FIG. 8, an operation in step 712 of FIG. 7, that is, re-establishment of the F2 bearer is described in detail.

Referring to FIG. 8, an illustrated low latency providing system includes a low latency terminal 800, a low latency base station 810, a GW 830 connected to the low latency base station 810, a low latency base station 820, a GW 840 connected to the low latency base station 820, a low latency base station server 850, and an Internet server 860. In addition, it is assumed that the low latency base station 810 is a source base station of the low latency terminal 800 and the low latency base station 820 is a target base station of the low latency terminal 800.

The low latency terminal 800 transmits, periodically or when a specific even occurs, a measurement report to the low latency base station 810 that is a source base station (step 802). The measurement report includes information on neighboring base stations to which the low latency terminal 800 may perform a handover.

The low latency base station 810 selects a target base station based on the measurement report received from the low latency terminal 800, and updates a context by transmitting a general context and a low latency context to the low latency base station 820 that is selected as the target base station (step 804). The general context and the low latency context have been described in detail in TABLE 1, and a description thereof will be thus omitted here.

The low latency base station 810 transmits a handover command message to the low latency terminal 800 (step 806) so as to indicate to perform a handover to the low latency base station 820 that is the target base station.

The low latency terminal 800 performs a handover to the low latency base station 820 (step 808), so that the low latency base station 820 re-establishes the F2 bearer with the low latency base station server 850 (step 812). According to an example described herein, step 808 and step 812 are sequentially performed. However, depending on a case, step 808 and step 812 may be concurrently performed and/or step 812 may be performed first and then step 808 may be performed later.

The low latency terminal 800, which has performed the handover from the low latency base station 810 that is the source base station to the low latency base station 820 that is the target base station, continuously receives data associated with an on-going low latency service from the low latency base station server 850 through an illustrated path

814. That is, the low latency terminal 800 may maintain an existing service connection through the re-established F2 bearer.

Figure 9A:
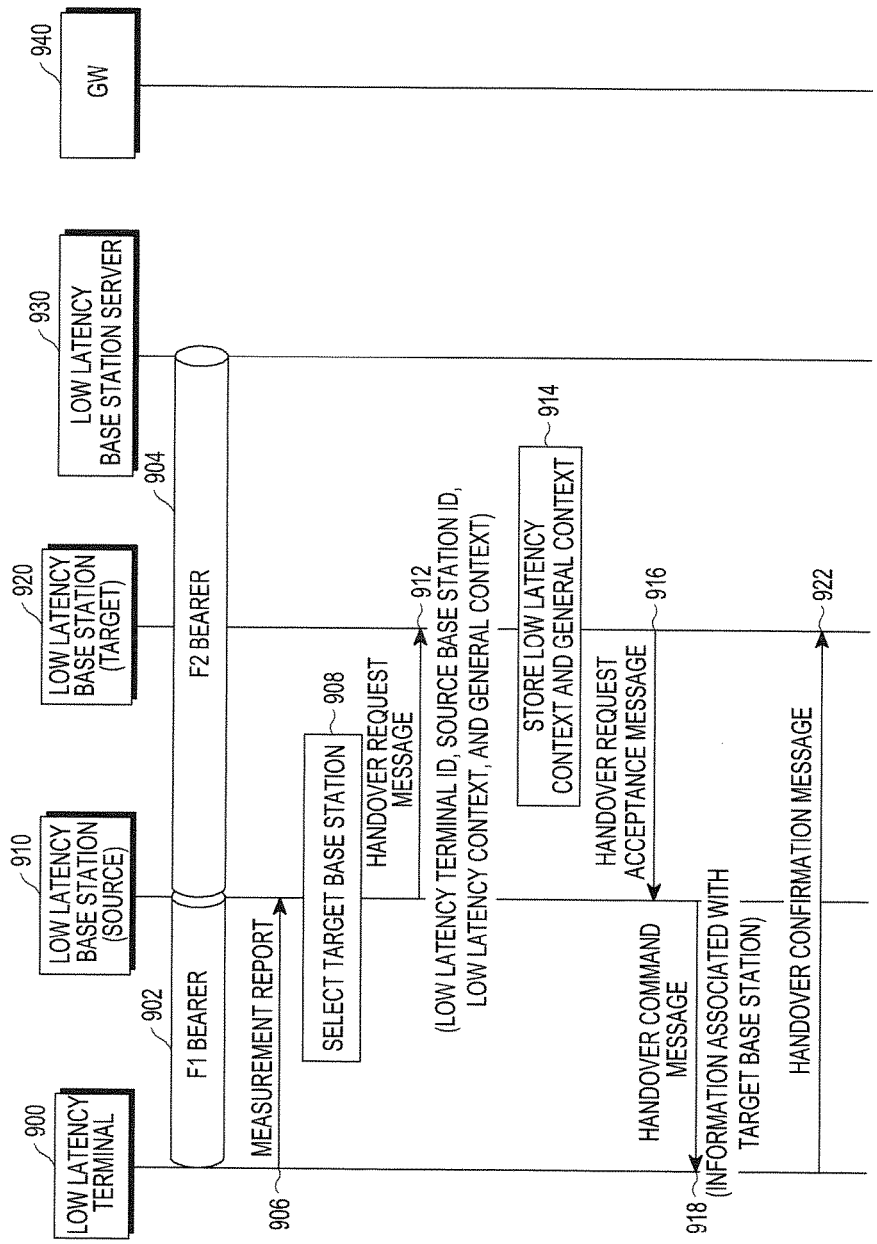
FIGS. 9A and 9B are signal flow diagrams illustrating an example of a procedure for performing a handover when a target base station supports an on-going low latency service in a low latency providing system according to an embodiment of the present disclosure.
Figure 9B:
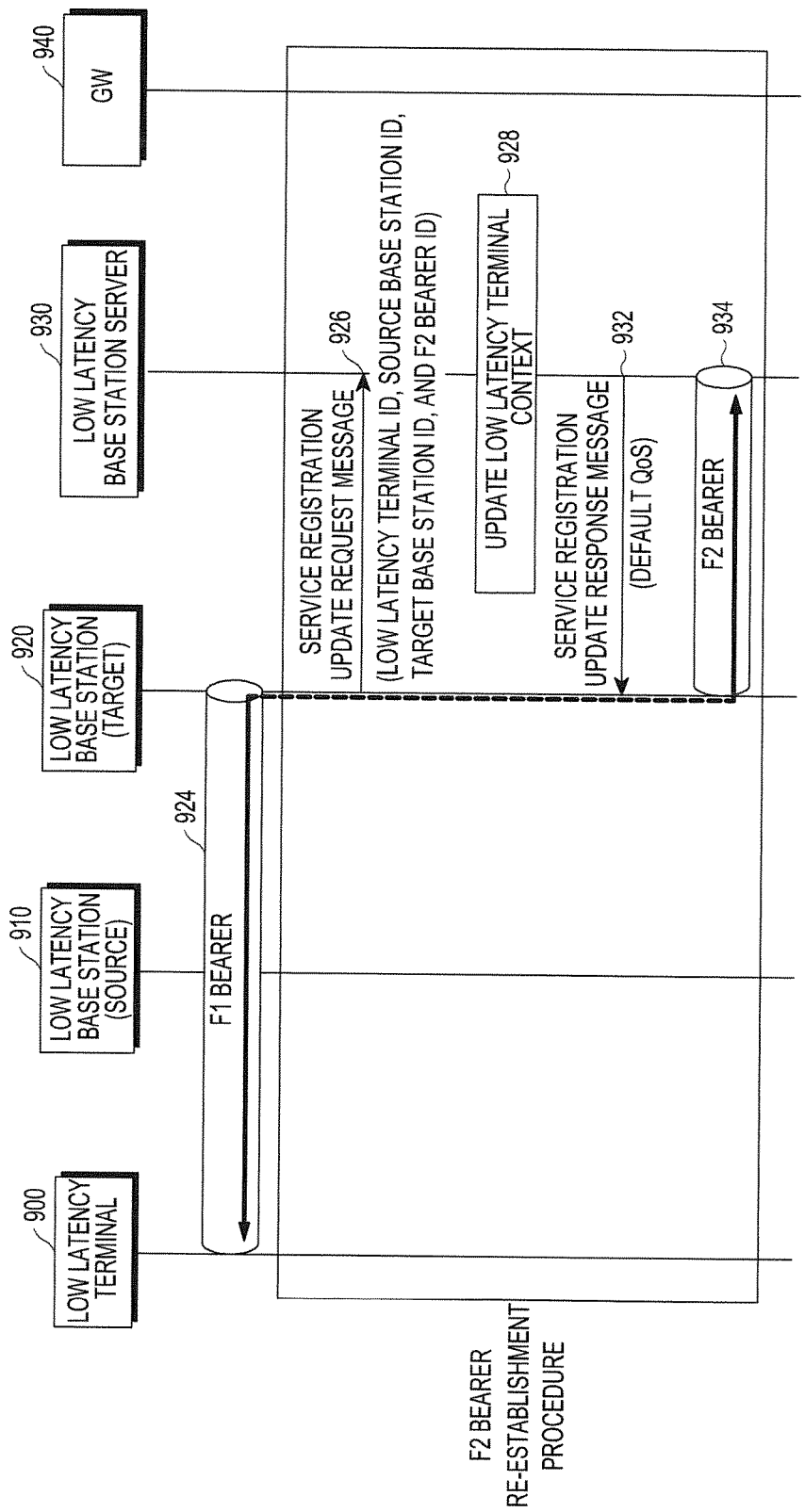

FIGS. 9A and 9B are signal flow diagrams illustrating an example of a procedure for performing a handover when a target base station supports an on-going low latency service in a low latency providing system according to an embodiment of the present disclosure.

Referring to FIGS. 9A and 9B, an illustrated low latency providing system includes a low latency terminal 900, a low latency base station 910 that is a source base station, a low latency base station 920 that is a target base station, a low latency base station server 930, and a GW 940. The GW 940 may be, for example, a base station GW and/or a System Architecture Evolution (SAE) GW.

In addition, it is assumed that an F1 bearer 902 is provided between the low latency terminal 900, and the low latency base station 910 and an F2 bearer 904 is provided between the low latency base station 910 and the low latency base station server 930.

The low latency terminal 900 transmits, periodically or when a specific event occurs, a measurement report to the low latency base station 910 (step 906). The measurement report includes information on neighboring base stations to which the low latency terminal 900 may perform a handover.

The low latency base station 910 selects a target base station based on the measurement report received from the low latency terminal 900 (step 908), so as to transmit a handover request message that requests a handover to the selected target base station, that is, the low latency base station 920 (step 912). The handover request message includes at least one of an ID of the low latency terminal 900, an ID of the low latency base station 910 that is a source base station, a low latency context, and a general context. The general context and the low latency context have been described in detail in TABLE 1, and a description thereof will be thus omitted here.

The low latency base station 920 stores the general context and low latency context included on the received handover request message (step 914), and transmits, to the low latency base station 910, a handover request acceptance message for accepting a handover request of the low latency base station 910 (step 916).

The low latency base station 910 transmits, to the low latency terminal 900, a handover command message that commands to perform a handover to the target base station (step 918). The handover command message includes information associated with the target base station, for example, identification information of the target base station, information on a low latency service desired by the target base station, and the like.

The low latency terminal 900 transmits a handover confirmation message to the low latency base station 920 indicated by information associated with the target base station, included in the received handover command message (step 922), so as to perform a handover. After the handover is performed, an F1 bearer 924 is established between the low latency terminal 900 and the low latency base station 920.

Later, the low latency base station 920 transmits, to the base station server 930, a service registration update request message for requesting re-establishment of the F2 bearer (step 926). The service registration update request message includes at least one of an ID of the low latency terminal 900, an ID of the low latency base station 910 that is a source base station, an ID of the low latency base station 920 that is a target base station, and an ID of the F2 bearer 904 having been provided between the low latency base station 910 and the low latency base station server 930.

The low latency base station server 930 updates a context associated with the low latency terminal 900 based on information included in the received service registration update request message (step 928), and transmits, to the low latency base station 920, a service registration update response message for accepting the re-establishment of the F2 bearer (step 932). The service registration update response message includes a default QoS. Later, a re-established F2 bearer 934 is provided between the low latency base station 920 and the low latency base station server 930.

The low latency terminal 900 receives data associated with a low latency service through the F2 bearer 904 provided between the low latency base station 910 that is a source base station and the low latency base station server 930 before the handover is performed, and receives data associated with the low latency service through the F2 bearer 934 provided between the low latency base station 920 and the low latency base station server 930 after the handover is performed.

Accordingly, the low latency terminal 900 may continuously receive data associated with an on-going low latency service without disconnection through the re-established F2 bearer 934 even after the handover is performed.

Figure 10:
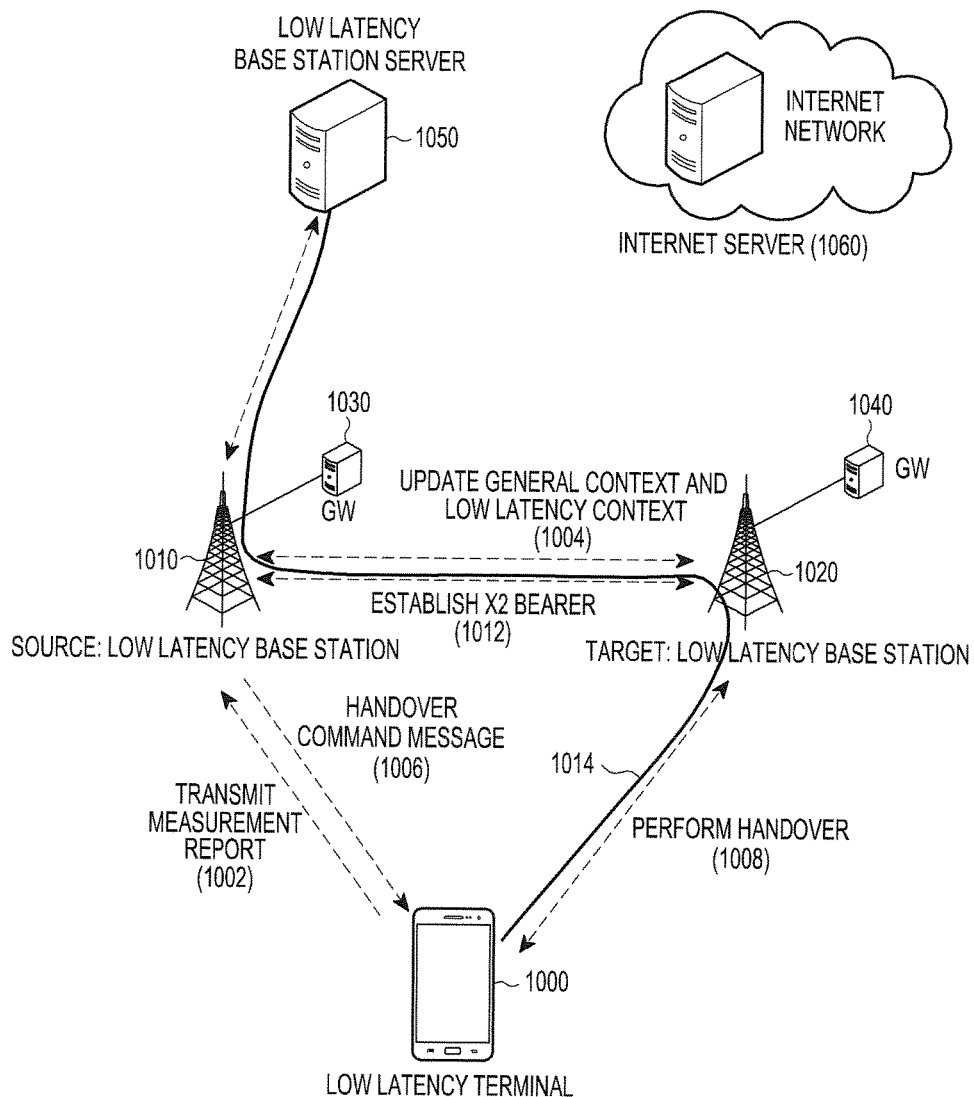
FIG. 10 is a diagram illustrating an example of performing a handover when a target base station is a low latency base station that does not support an on-going low latency service and the on-going low latency service is a service requiring session continuity in a low latency providing system according to an embodiment of the present disclosure.

FIG. 10 is a diagram illustrating an example of performing a handover when a target base station is a low latency base station that does not support an on-going low latency service and the on-going low latency service is a service requiring session continuity in a low latency providing system according to an embodiment of the present disclosure. In FIG. 10, an operation in step 718 of FIG. 7, that is, anchoring of the F2 bearer is described in detail.

Referring to FIG. 10, an illustrated low latency providing system includes a low latency terminal 1000, a low latency base station 1010, a GW 1030 connected to the low latency base station 1010, a low latency base station 1020, a GW 1040 connected to the low latency base station 1020, a low latency base station server 1050, and an Internet server 1060. In addition, it is assumed that the low latency base station 1010 is a source base station of the low latency terminal 1000 and the low latency base station 1020 is a target base station of the low latency terminal 1000.

The low latency terminal 1000 transmits, periodically or when a specific event occurs, a measurement report to the low latency base station 1010 that is a source base station (step 1002). The measurement report includes information on neighboring base stations to which the low latency terminal 1000 may perform a handover.

The low latency base station 1010 selects a target base station based on the measurement report received from the low latency terminal 1000, and updates a context by transmitting a general context and a low latency context to the low latency base station 1020 selected as a target base station (step 1004). The general context and the low latency context have been described in detail in TABLE 1, and a description thereof will be thus omitted here. In addition, the low latency base station 1010 establishes an X2 bearer with the low latency base station 1020 (step 1012). The X2 bearer is used for transmitting, by the low latency base station 1010, data associated with a low latency service, which is received from the low latency base station server 1050 to the low latency base station 1020. According to an example described herein, step 1004 and step 1012 are sequentially performed. However, depending on a case, step 1004 and step 1012 may be concurrently performed and/or step 1012 may be performed first and then step 1004 may be performed later.

The low latency base station 1010 transmits a handover command message to the low latency terminal 1000 (step 1006), so as to indicate to perform a handover to the low latency base station 1020 that is a target base station. Here, the handover command message includes information associated with the target base station. Information associated with the target base station includes, for example, identification information of the target base station, information on the low latency service supported by the target base station.

The low latency terminal 1000 performs a handover to the low latency base station 1020 (step 1008). The low latency terminal 1000 that has performed the handover from the low latency base station 1010 that is the source base station to the low latency base station 1020 that is the target base station continuously receives data associated with an on-going low latency service from the low latency base station server 1050 through an illustrated path 1014. That is, the low latency terminal 1000 may maintain an existing service connection through the X2 bearer established between the low latency base station 1010 and the low latency base station 1020.

Figure 11A:
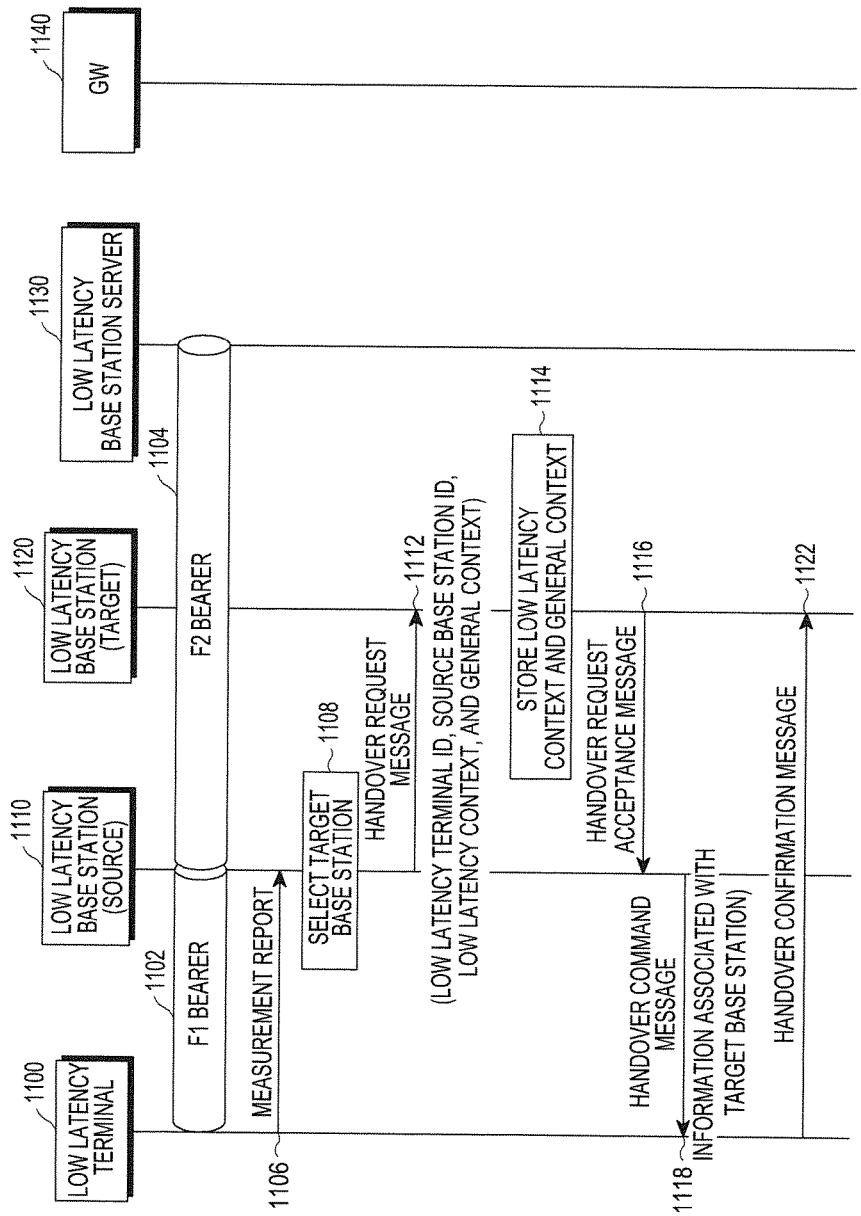
FIGS. 11A and 11B are signal flow diagrams illustrating an example of performing a handover when a target base station is a low latency base station that does not support an on-going low latency service and the on-going low latency service is a service requiring session continuity in a low latency providing system according to an embodiment of the present disclosure.
Figure 11B:
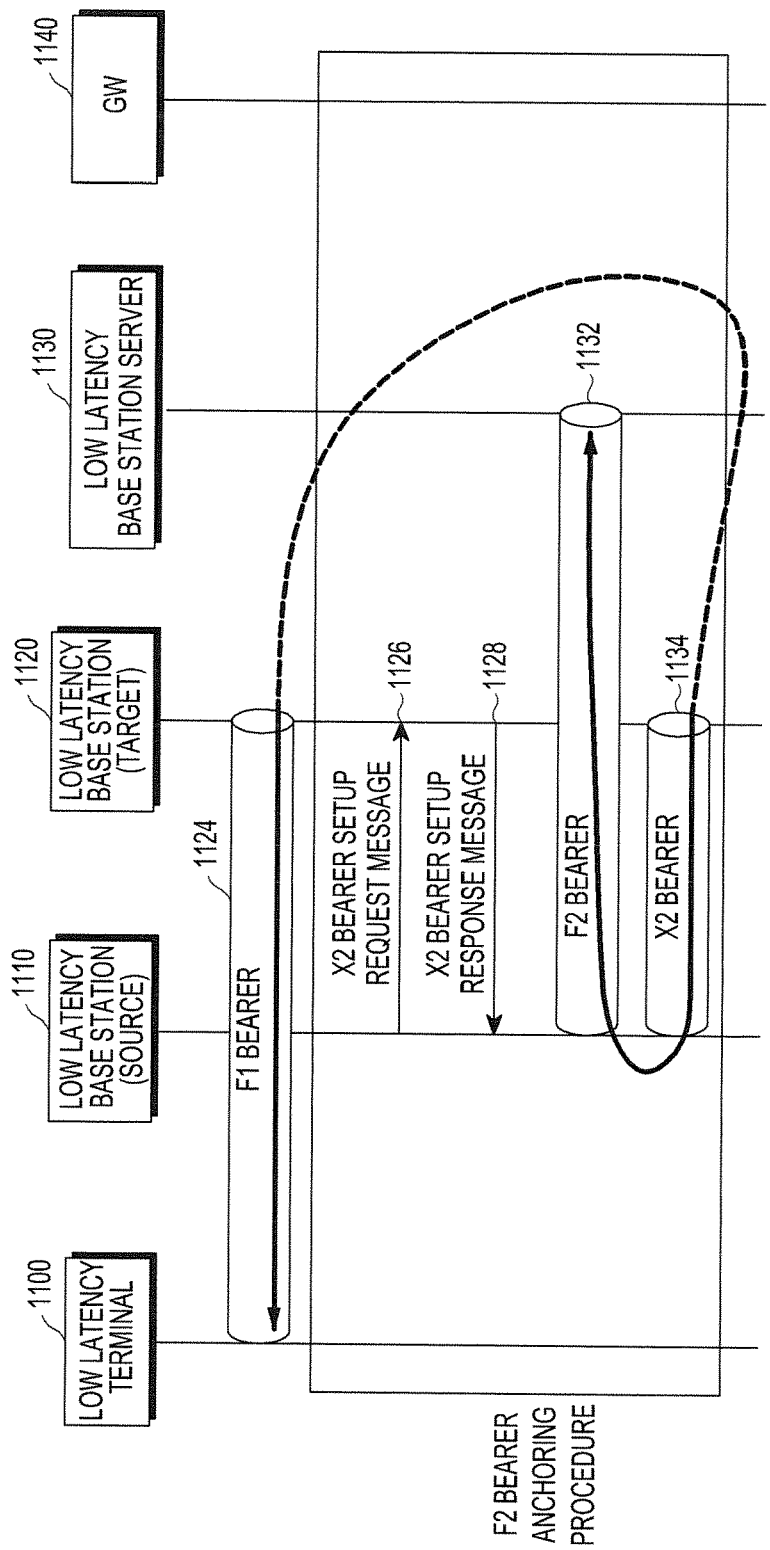

FIGS. 11A and 11B are signal flow diagrams illustrating an example of performing a handover when a target base station is a low latency base station that does not support an on-going low latency service and the on-going low latency service is a service requiring session continuity in a low latency providing system according to an embodiment of the present disclosure Referring to FIGS. 11A and 11B, an illustrated low latency providing system includes a low latency terminal 1100, a low latency base station 1110 that is a source base station, a low latency base station 1120 that is a target base station, a low latency base station server 1130, and a GW 1140. The GW 1140 may be, for example, a base station GW and/or an SAE GW.

In addition, it is assumed that an F1 bearer 1102 is provided between the low latency terminal 1100 and the low latency base station 1110, and an F2 bearer 1104 is provided between the low latency base station 1110 and the low latency base station server 1130.

The low latency terminal 1100 transmits, periodically or when a specific event occurs, a measurement report to the low latency terminal 1110 (step 1106). The measurement report includes information on neighboring base stations to which the low latency terminal 1100 may perform a handover.

The low latency base station 1110 selects a target base station based on the measurement report received from the low latency terminal 1100 (step 1108), and transmits a handover request message that requests a handover to the selected target base station, that is, the low latency base station 1120 (step 1112). The handover request message includes at least one of an ID of the low latency terminal 1100, an ID of the low latency base station 1110 that is a source base station, a low latency context, and a general context. The general context and the low latency context have been described in detail in TABLE 1, and a description thereof will be thus omitted here.

The low latency base station 1120 stores the general context and the low latency context which are included in the received handover request message (step 1114), and transmits, to the low latency base station 1110, a handover request acceptance message for accepting a handover request of the low latency base station 1110 (step 1116). The low latency base station 1110 transmits, to the low latency terminal 1100, a handover command message that commands to perform a handover to the target base station (step 1118). The handover command message includes information associated with the target base station, for example, identification information of the target base station, information on a low latency service supported by the target base station, and the like.

The low latency terminal 1100 transmits a handover confirmation message to the low latency base station 1120 indicated by information associated with the target base station, included in the received handover command message (step 1122) so as to perform a handover. After the handover is performed, an F1 bearer 1124 is established between the low latency terminal 1100 and the low latency base station 1120.

Later, the low latency base station 1110 transmits, to the low latency base station 1120, an X2 bearer setup request message for requesting an X2 bearer establishment (step 1126), and receives an X2 bearer setup response message from the low latency base station 1120 (step 1128), so as to establish an X2 bearer 1134. An X2 bearer establishment method used in a legacy system (for example, an LTE system) may be applied to a method for establishing the X2 bearer 1134.

The low latency terminal 1100 may continuously receive data associated with the low latency service that has been received through the F2 bearer 1132 pre-established before performing the handover, through the X2 bearer 1134 provided between the low latency base station 1110 that is the source base station and the low latency base station 1120 that is the target base station even after performing the handover. That is, the X2 bearer 1134 performs anchoring of the F1 bearer 1124 provided between the low latency terminal 1100 and the low latency base station 1120 and the F2 bearer 1132 provided between the low latency base station 1110 and the low latency base station server 1130, and the low latency terminal 1100 receives data associated with the low latency service transmitted from the low latency base station server 1130 through the F2 bearer 1132, the X2 bearer 1134, and the F1 bearer 1124. The embodiment of the present disclosure has described an example in which an X2 bearer is provided between the low latency base station 1110 and the low latency base station 1120. However, a bearer other than the X2 bearer may be provided between the low latency base station 1110 and the low latency base station 1120.

Figure 12:
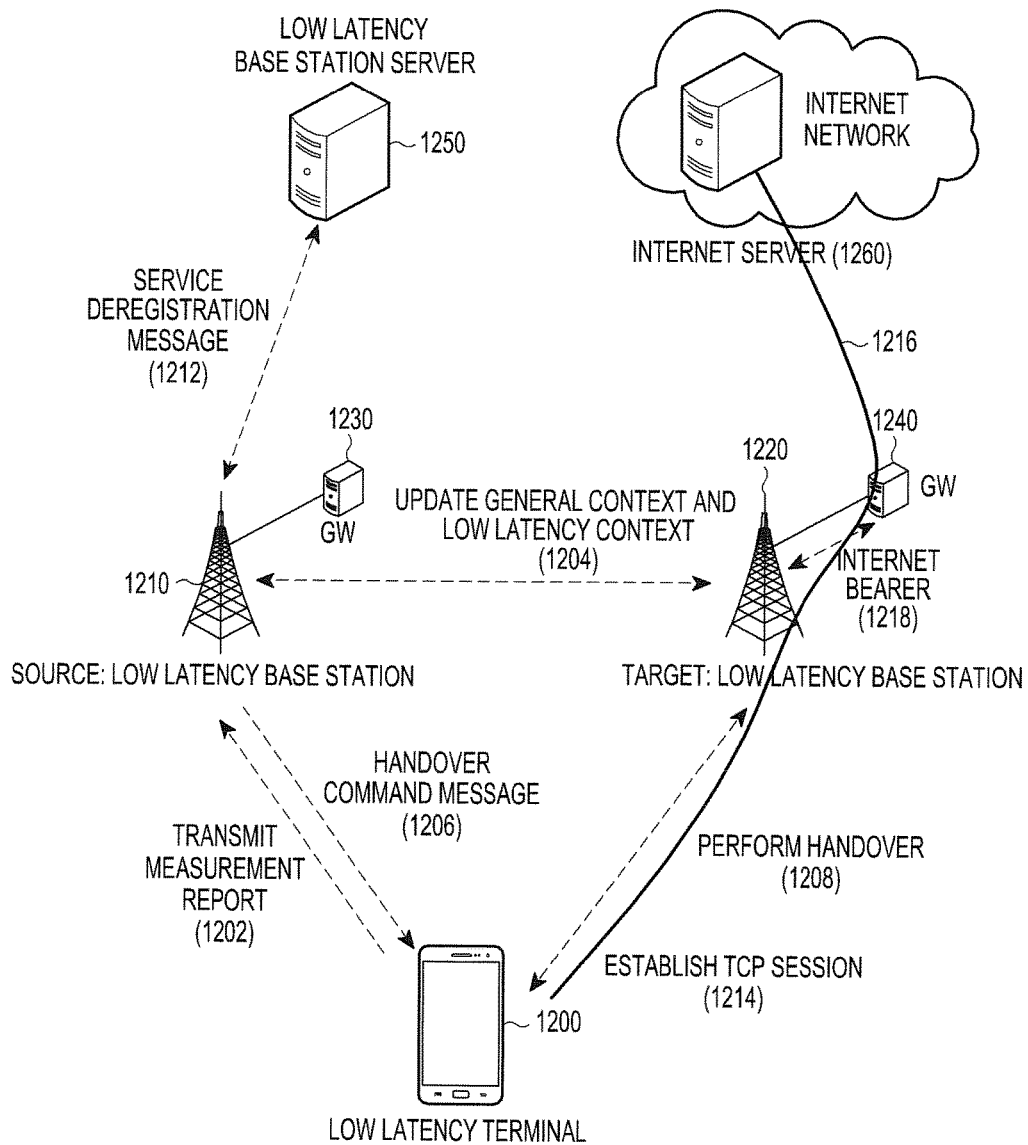
FIG. 12 is a diagram illustrating an example of performing a handover when a target base station is a low latency base station that does not support an on-going low latency service and the on-going low latency service is not a service requiring session continuity, in a low latency providing system according to an embodiment of the present disclosure.

FIG. 12 is a diagram illustrating an example of performing a handover when a target base station is a low latency base station that does not support an on-going low latency service and the on-going low latency service is not a service requiring session continuity, in a low latency providing system according to an embodiment of the present disclosure. In FIG. 12, an operation in step 720 of FIG. 7 (that is, performing a fallback to an Internet server) is described in detail.

Referring to FIG. 12, an illustrated low latency providing system includes a low latency terminal 1200, a low latency base station 1210, a GW 1230 connected to the low latency base station 1210, a low latency base station 1220, a GW 1240 connected to the low latency base station 1220, a low latency base station server 1250, and an Internet server 1260. In addition, it is assumed that the low latency base station 1210 is a source base station of the low latency terminal 1200 and the low latency base station 1220 is a target base station of the low latency terminal 1200.

The low latency terminal 1200 transmits, periodically or when a specific event occurs, a measurement report to the low latency base station 1210 (step 1202). The measurement report includes information on neighboring base stations to which the low latency terminal 1200 may perform a handover.

The low latency base station 1210 selects a target base station based on the measurement report received from the low latency terminal 1200, and updates a context by transmitting a general context and a low latency context to the low latency base station 1220 selected as the target base station (step 1204). The general context and the low latency context have been described in detail in TABLE 1, and a description thereof will be thus omitted here.

The low latency base station 1210 transmits a handover command message to the low latency terminal 1200 so as to indicate to perform a handover to the low latency base station 1220 that is the target base station. Here, the handover command message includes information indicating to operate in a fallback mode. The fallback mode refers to a mode in which a service requested by the low latency terminal 1200 is received from the Internet server 1260.

The low latency terminal 1200 performs a handover to the low latency base station 1220 that is a target base station (step 1208). Later, the low latency base station 1210 transmits a service deregistration message to the low latency base station server 1250 (step 1212) to cancel the registration of the low latency terminal 1200 from the low latency base station server 1250. According to an example described herein, step 1208 and step 1212 are sequentially performed. However, depending on a case, step 1208 and step 1212 may be concurrently performed and/or step 1212 may be performed first and then step 1208 may be performed later.

The low latency terminal 1200 establishes a TCP session in order to set up a service connection with the Internet server 1260 through an Internet bearer 1218 provided between the low latency base station 1220 and the GW 1240 (step 1214). The internet bearer 1218 refers to a bearer that has been established or re-established in a procedure for performing a handover by the low latency terminal 1200. A handover method used in a legacy system (for example, an LTE system) also supports establishment or re-establishment of the Internet bearer. Here, it is assumed that the Internet server 1260 provides the same service as the low latency base station server 1250.

The low latency terminal 1200, which has performed the handover from the low latency base station 1210 to the low latency base station 1220, continuously receives data associated with an on-going low latency service from the Internet server 1260 through an illustrated path 1216. That is, the low latency terminal 1200 may maintain an existing service connection by setting up a service connection with the Internet server 1260 through the Internet bearer 1218.

Figure 13A:
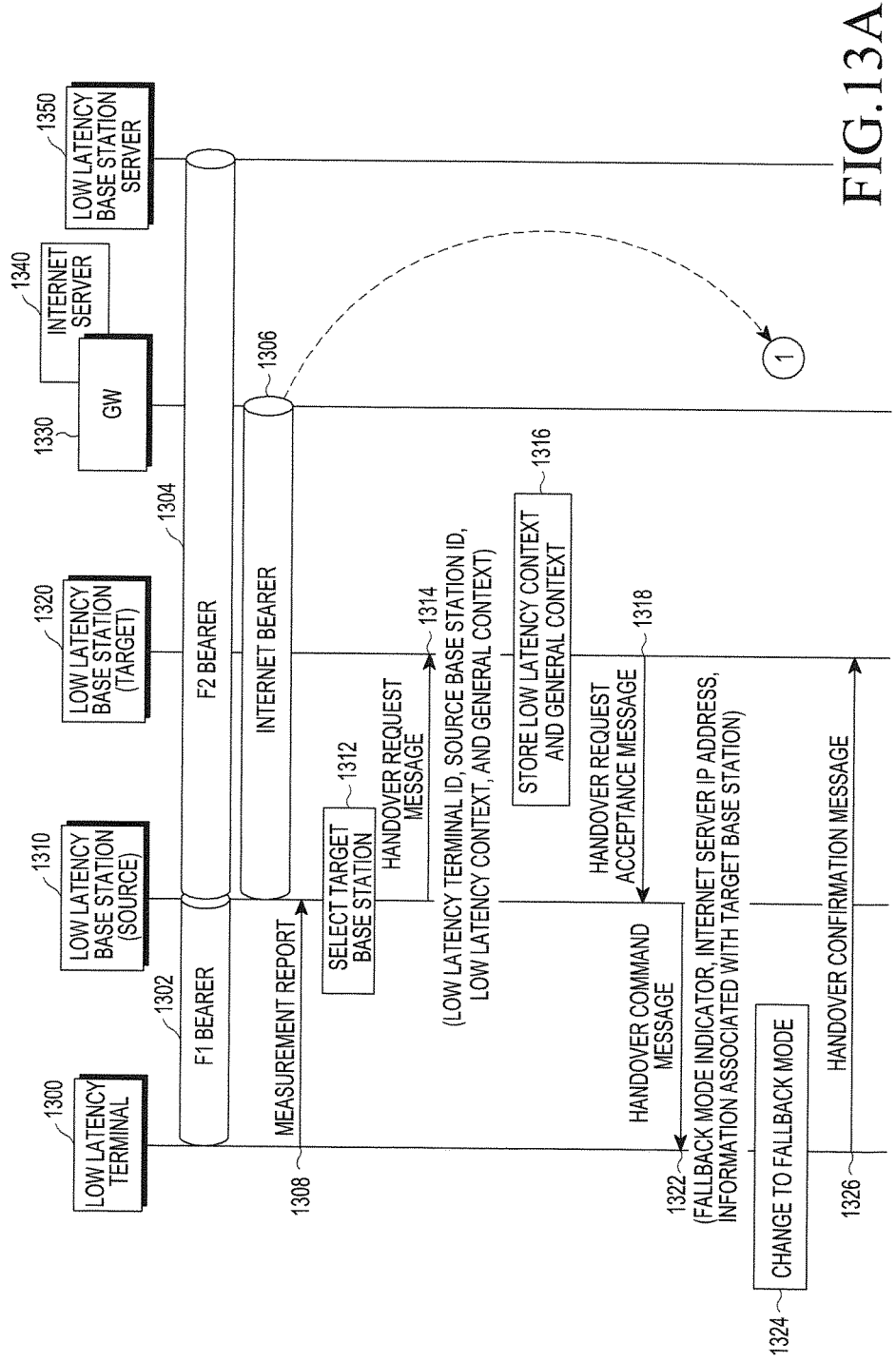
FIGS. 13A and 13B are signal flow diagrams illustrating an example of performing a handover when a target base station is a low latency base station that does not support an on-going low latency service and the on-going low latency service is not a service requiring session continuity, in a low latency providing system according to an embodiment of the present disclosure.
Figure 13B:
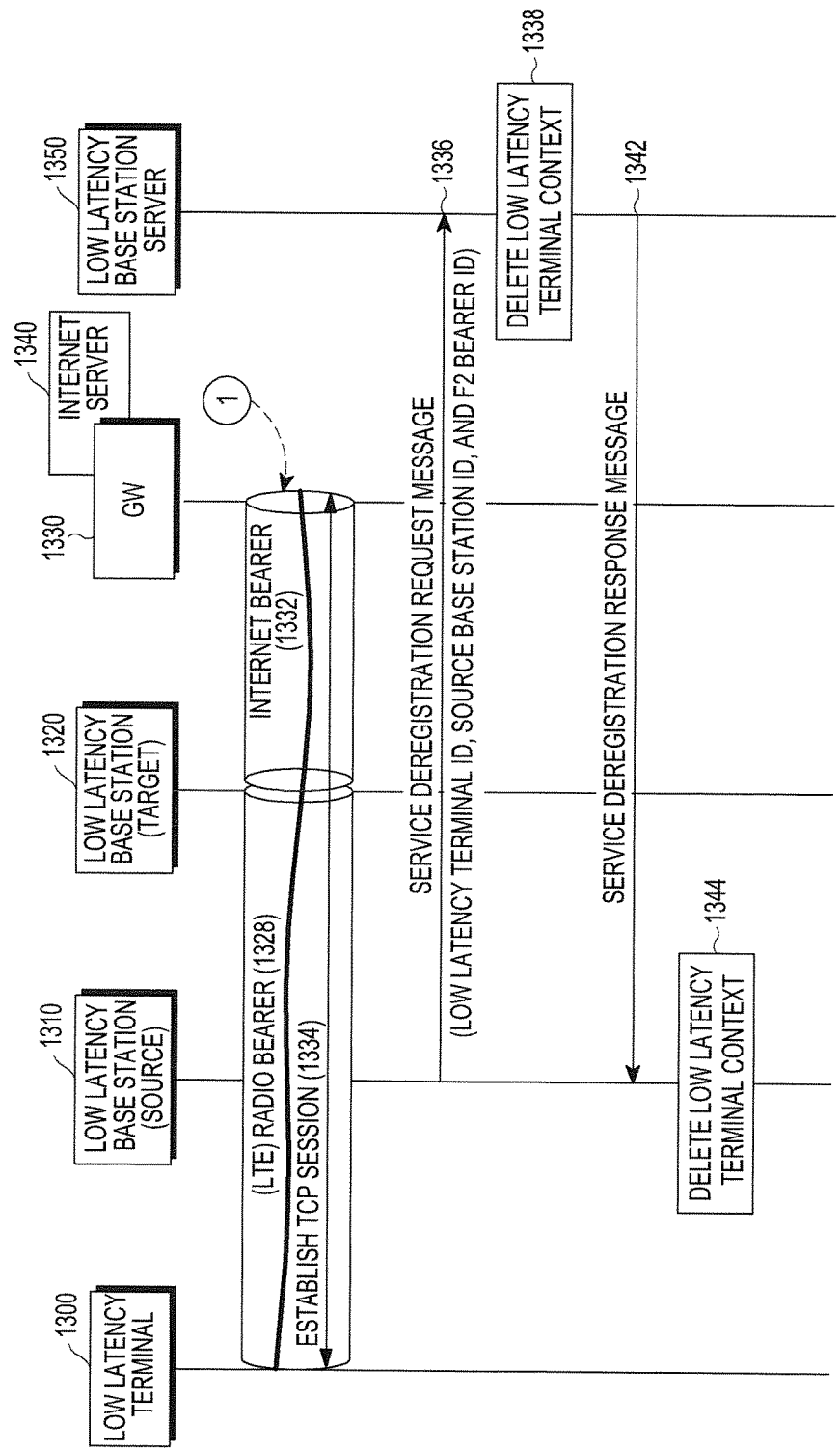

FIGS. 13A and 13B are signal flow diagrams illustrating an example of performing a handover when a target base station is a low latency base station that does not support an on-going low latency service and the on-going low latency service is not a service requiring session continuity, in a low latency providing system according to an embodiment of the present disclosure.

Referring to FIGS. 13A and 13B, an illustrated low latency providing system includes a low latency terminal 1300, a low latency base station 1310 that is a source base station, a low latency base station 1320 that is a target base station, a GW 1330, an Internet server 1340, and a low latency base station server 1350. The GW 1330 may be, for example, a base station GW and/or an SAE GW.

In addition, it is assumed that an F1 bearer 1302 is provided between the low latency terminal 1300 and the low latency base station 1310, an F2 bearer 1304 is provided between the low latency base station 1310 and the low latency base station server 1350, and an Internet bearer 1306 is provided between the low latency base station server 1350 and the Internet server 1340.

The low latency terminal 1300 transmits, periodically or when a specific event occurs, a measurement report to the low latency base station 1310 (step 1308). The measurement report includes information on neighboring base stations to which the low latency terminal 1300 may perform a handover.

The low latency base station 1310 selects a target base station based on the measurement report received from the low latency terminal 1300 (step 1312), and transmits a handover request message that requests a handover to the selected target base station, that is, the low latency base station 1320 (step 1314). The handover request message includes at least one of an ID of the low latency terminal 1300, an ID of the low latency base station 1310 that is a source base station, a low latency context, and a general context. The general context and the low latency context have been described in detail in TABLE 1, and a description thereof will be thus omitted here.

The low latency base station 1320 stores the general context and the low latency context, which are included in the received handover request message (step 1316), and transmits, to the low latency base station 1310, a handover request acceptance message for accepting a handover request of the low latency base station 1310 (step 1318).

The low latency base station 1310 transmits, to the low latency terminal 1300, a handover command message that commands to perform a handover to the target base station (step 1322). The handover command message includes a fallback mode indicator, an Internet server IP address, and information associated with the target base station. The fallback mode indicator refers to an indicator that indicates to operate in a fallback mode, and the Internet server IP address refers to an IP address of an Internet server that provides the same service as the low latency base station server 1350. Information associated with the target base station includes, for example, identification information of the target base station, information on a low latency service supported by the target base station, and the like.

The low latency terminal 1300 changes an operation mode to the fallback mode based on the fallback mode indicator included in the received handover command message (step 1324), and transmits a handover confirmation message to the low latency base station 1320 indicated by information associated with the target base station, included in the received handover command message (step 1326) so as to perform a handover.

In addition, the low latency terminal 1300 establishes a (LTE) radio bearer 1328 with the low latency base station 1320 that has performed a handover, and an Internet bearer 1332 is provided between the low latency base station 1320 and the GW 1330 after the handover is performed. A re-establishment procedure of a pre-established Internet bearer in a handover procedure in an LTE system is not closely related to the present disclosure, and the description thereof is thus omitted. Later, the low latency terminal 1300 establishes a TCP session with the Internet server 1340 through the (LTE) radio bearer 1328 and the Internet bearer 1332 (step 1334).

The low latency base station 1310 checks whether the handover by the low latency terminal 1300 has been completed, and, when the handover has been completed, transmits a service deregistration request message to the low latency base station server 1350 (step 1336), so as to request deregistration of the low latency terminal 1300 from the low latency base station server 1350. The service deregistration request message includes at least one of an ID of the low latency terminal 1300, an ID of the low latency base station 1310 that is a source base station, and an ID of the F2 bearer 1304.

The low latency base station server 1350 cancels registration of the low latency terminal 1300 by deleting a low latency terminal context (step 1338), and transmits a service deregistration response message to the low latency base station 1310 (step 1342).

The low latency base station 1310 cancels registration of the low latency terminal 1300 by deleting the low latency terminal context based on the received service deregistration response message (step 1311).

Figure 14:
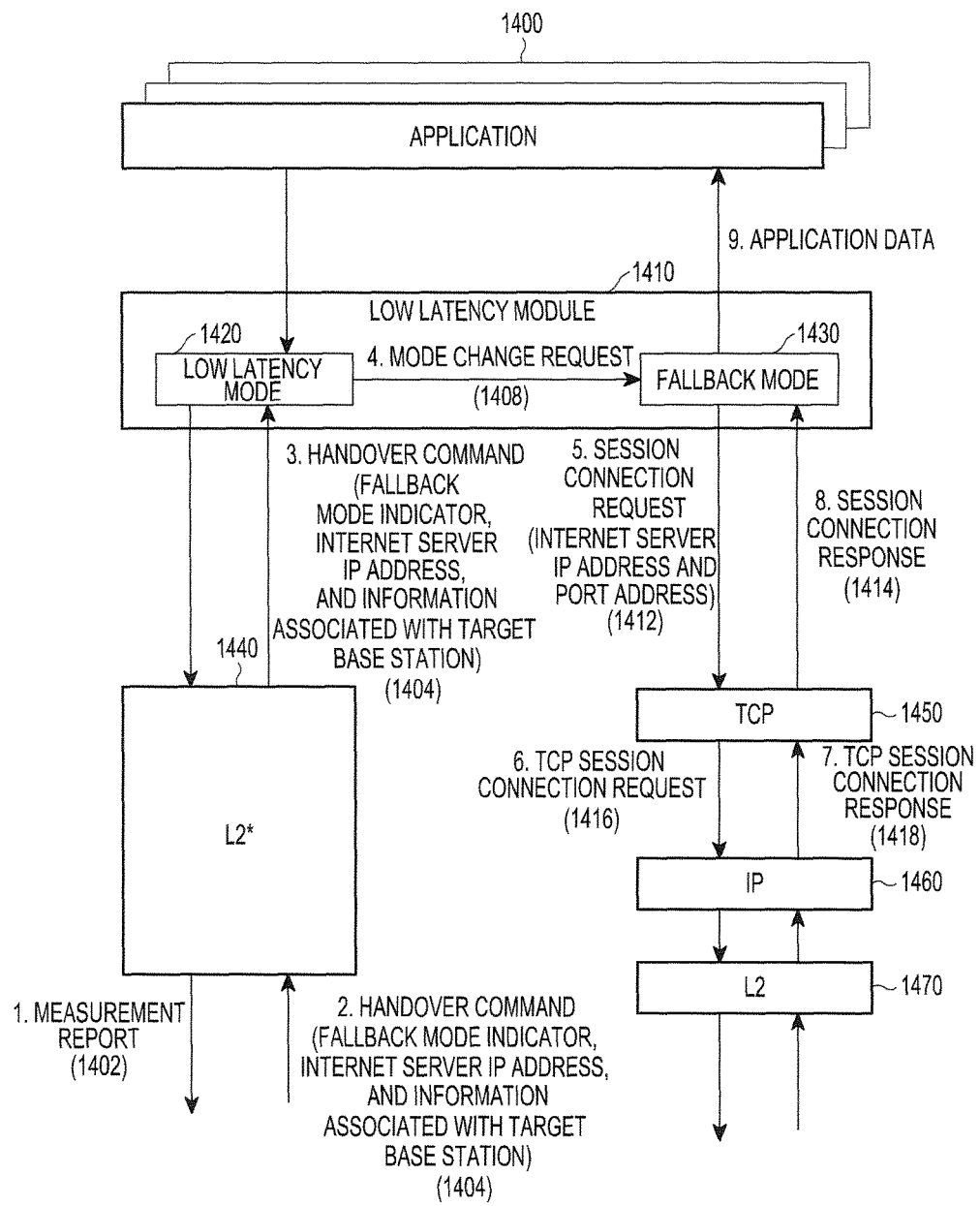
FIG. 14 is a diagram illustrating an example of an internal operation of a low latency terminal that performs a handover when a target base station is a low latency base station that does not support an on-going low latency service and the on-going low latency service is not a service requiring session continuity, in a low latency providing system according to an embodiment of the present disclosure.

FIG. 14 is a diagram illustrating an example of an internal operation of a low latency terminal that performs a handover when a target base station is a low latency base station that does not support an on-going low latency service and the on-going low latency service is not a service requiring session continuity, in a low latency providing system according to an embodiment of the present disclosure.

Referring to FIG. 14, it is assumed that a low latency terminal includes a low latency module 1410, and the low latency module 1410 includes a low latency mode element 1420 activated when the low latency terminal operates in a low latency mode, and a fallback mode element 1430 activated when the low latency terminal operates in a fallback mode. In addition, it is assumed that the low latency terminal currently operates in the low latency mode and at least one application 1400 is installed in the low latency terminal.

The low latency terminal transmits, periodically or when a specific event occurs, a measurement report to a low latency base station through an L2* layer 1440 (step 1402).

Later, the low latency terminal receives, from the low latency base station, a handover command message that commands to perform a handover to a target base station through the L2* layer 1440 (steps 1404 and 1406). Here, the L2* layer 1440 functions to receive the handover command message and transmits the same to the low latency module 1410. The handover command message includes at least one of a fallback mode indicator, an Internet server IP address, and information associated with a target base station. The fallback mode indicator refers to an indicator that indicates to operate in the fallback mode, and the Internet server IP address refers to an IP address of an Internet server providing the same service as the low latency base station server that currently provides a service to the low latency base station.

The low latency module 1410 checks the fallback mode indicator included in the received handover command message, and transmits a mode change request message for activating the fallback mode elements 1430 (step 1408). That is, the low latency mode element 1420 transmits the mode change request message to the fallback mode element 1430 so as to activate the fallback mode element 1430.

Later, the fallback mode element 1430 transmits a session connection request message to a TCP layer 1450 (step 1412), and the TCP layer 1450 transmits the TCP session connection request message to an IP layer 1460 (step 1416). The session connection request message includes at least one of an Internet server IP address and a port address.

Later, the TCP layer 1450 receives a TCP session connection response message from the IP layer 1460 in response to the TCP session connection request message (step 1418), and transmits, to the fallback mode element 1430, the session connection response message in response to the session connection request message received in step 1412, (step 1414).

Figure 15:
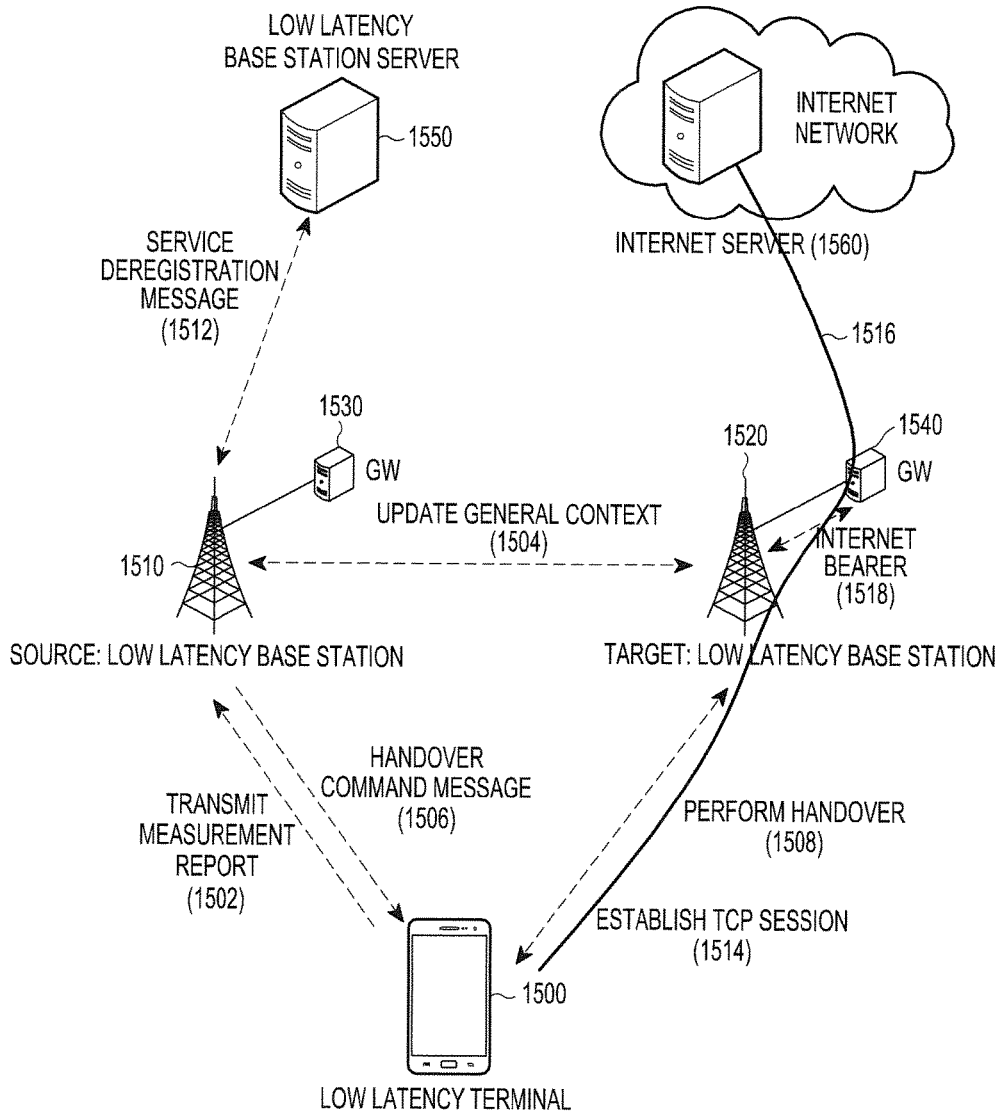
FIG. 15 is a diagram illustrating an example of performing a handover when a target base station is a legacy base station that does not support an on-going low latency service and the on-going low latency service is not a service requiring session continuity, in a low latency providing system according to an embodiment of the present disclosure.

FIG. 15 is a diagram illustrating an example of performing a handover when a target base station is a legacy base station that does not support an on-going low latency service and the on-going low latency service is not a service requiring session continuity, in a low latency providing system according to an embodiment of the present disclosure. In FIG. 15, an operation in step 716 of FIG. 7 (that is, performing a fallback to an Internet server) is described in detail.

Referring to FIG. 15, an illustrated low latency providing system includes a low latency terminal 1500, a low latency base station 1510, a GW 1530 connected to the low latency base station 1510, a low latency base station 1520, a GW 1540 connected to the low latency base station 1520, a low latency base station server 1550, and an Internet server 1560. In addition, it is assumed that the low latency base station 1510 is a source base station of the low latency terminal 1500 and the low latency base station 1520 is a target base station of the low latency terminal 1500.

The low latency terminal 1500 transmits, periodically or when a specific event occurs, a measurement report to the low latency base station 1510 that is a source base station (step 1502). The measurement report includes information on neighboring base stations to which the low latency terminal 1500 may perform a handover.

The low latency base station 1510 selects a target base station based on the measurement report received from the low latency terminal 1500. Here, it is assumed that the selected target base station (that is, the low latency base station 1520) is a legacy base station. The low latency base station 1510 updates a context by transmitting a general context to the selected low latency base station 1520 (step 1504). The general context has been described in detail in TABLE 1, and a description thereof will be thus omitted here.

The low latency base station 1510 transmits a handover command message to the low latency terminal 1500 (step 1506), so as to indicate to perform a handover to the low latency base station 1520 that is the target base station. Here, the handover command message includes at least one of a fallback mode indicator, an Internet server IP address, and information associated with a target base station. The fallback mode indicator refers to an indicator that indicates to operate in the fallback mode, and the Internet server IP address refers to an IP address of an Internet server providing the same service as the low latency base station server 1550. Information associated with the target base station includes, for example, identification information of the target base station, information on a low latency service supported by the target base station, and the like.

The low latency terminal 1500 performs a handover to the low latency base station 1520 (step 1508). Later, the low latency base station 1510 transmits a service deregistration message to the low latency base station server 1550 (step 1512) to cancel registration of the low latency terminal 1500 from the low latency base station server 1550. According to an example described herein, step 1508 and step 1512 are sequentially performed. However, depending on a case, step 1508 and step 1512 may be concurrently performed and/or step 1512 may be performed first and then step 1508 may be performed later.

The low latency terminal 1500 establishes a TCP session in order to set up a service connection with the Internet server 1560 through an Internet bearer 1518 provided between the low latency base station 1520 and the GW 1540 (step 1514). The internet bearer 1518 refers to a bearer that has been established or re-established in a procedure for performing a handover by the low latency terminal 1500. A handover method used in a legacy system (for example, an LTE system) also supports the establishment or re-establishment of the Internet bearer. Here, it is assumed that the Internet server 1560 provides the same service as the low latency base station server 1550.

The low latency terminal 1500, which has performed the handover from the low latency base station 1510 that is a source base station to the low latency base station 1520 that is a target base station, continuously receives data associated with an on-going low latency service from the Internet service 1560 through an illustrated path 1516. That is, the low latency terminal 1500 may maintain an existing service connection by setting up a service connection with the Internet server 1560 through the Internet bearer 1518.

Figure 16A:
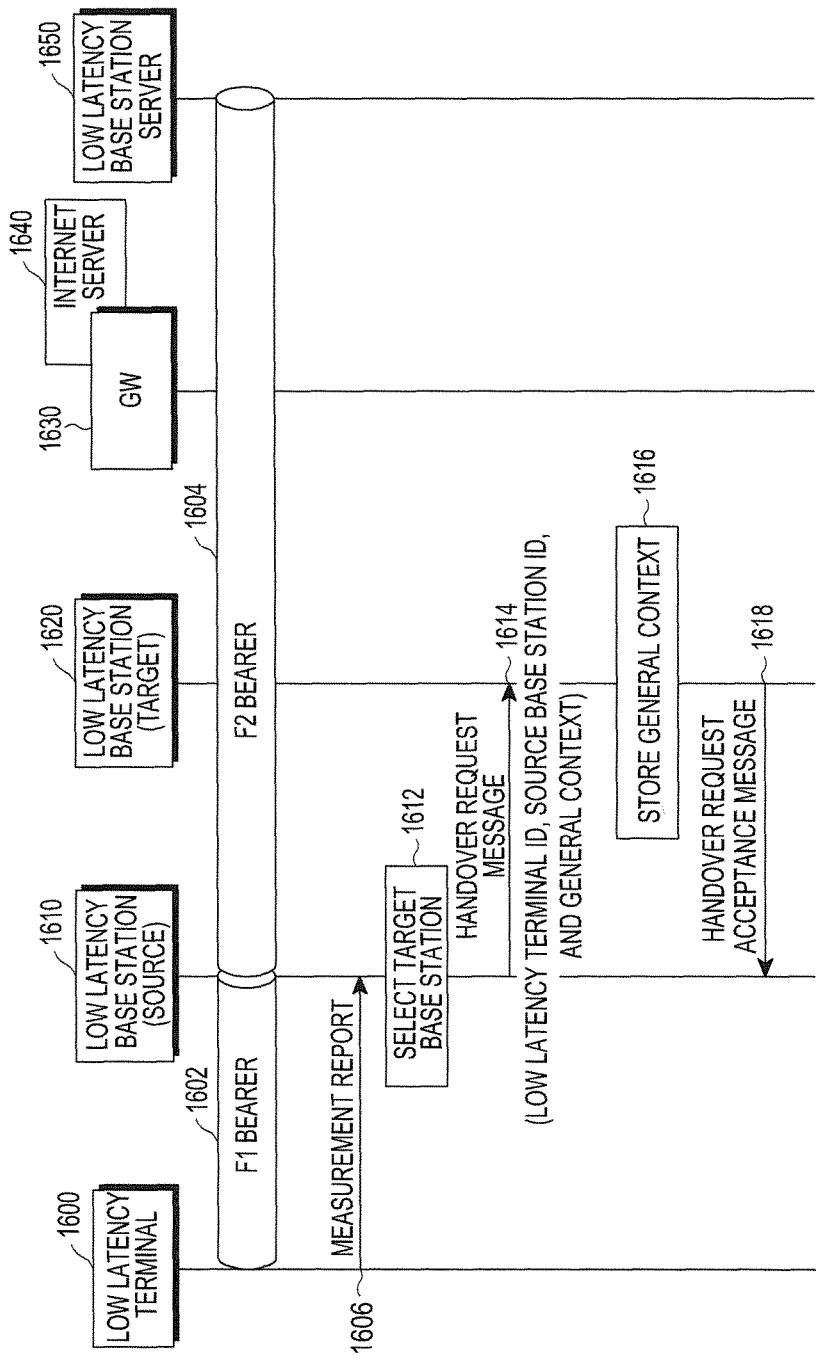
FIGS. 16A and 16B are signal flow diagrams illustrating an example of a procedure for performing a handover when a target base station is a legacy base station that does not support an on-going low latency service and the on-going low latency service is not a service requiring session continuity, in a low latency providing system according to an embodiment of the present disclosure.
Figure 16B:
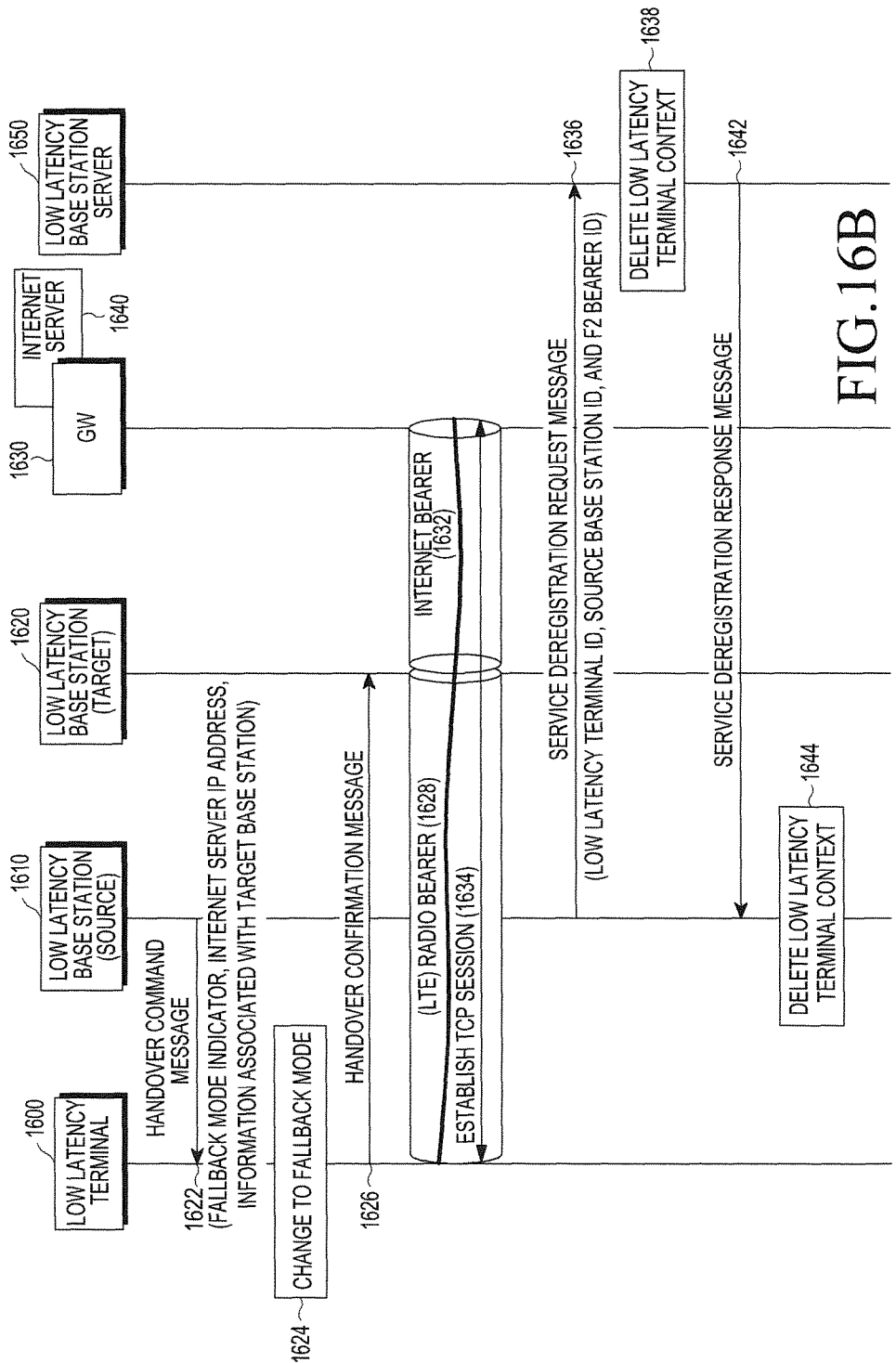

FIGS. 16A and 16B are signal flow diagrams illustrating an example of a procedure for performing a handover when a target base station is a legacy base station that does not support an on-going low latency service and the on-going low latency service is not a service requiring session continuity, in a low latency providing system according to an embodiment of the present disclosure.

Referring to FIGS. 16A and 16B, an illustrated low latency providing system includes a low latency terminal 1600, a low latency base station 1610 that is a source base station, a low latency base station 1620 that is a target base station, a GW 1630, an Internet server 1640, and a low latency base station server 1650. The GW 1630 may be, for example, a base station GW and/or an SAE GW.

In addition, it is assumed that an F1 bearer 1602 is provided between the low latency terminal 1600 and the low latency base station 1610, and an F2 bearer 1604 is provided between the low latency base station 1610 and the low latency base station server 1650.

The low latency terminal 1600 transmits, periodically or when a specific event occurs, a measurement report to the low latency base station 1610 (step 1606). The measurement report includes information on neighboring base stations to which the low latency terminal 1600 may perform a handover.

The low latency base station 1610 selects a target base station based on the measurement report received from the low latency terminal 1600 (step 1612), and transmits a handover request message that requests a handover to the selected target base station, that is, the low latency base station 1620 (step 1614). The handover request message includes at least one of an ID of the low latency terminal 1600, an ID of the low latency base station 1610 that is a source base station, and a general context. The general context has been described in detail in TABLE 1, and a description thereof will be thus omitted here.

The low latency base station 1620 stores the general context included in the received handover request message (step 1616), and transmits, to the low latency base station 1610, a handover request acceptance message for accepting a handover request of the low latency base station 1610 (step 1618).

The low latency base station 1610 transmits, to the low latency terminal 1600, a handover command message that commands to perform a handover to the target base station (step 1622). The handover command message includes at least one of a fallback mode indicator, an Internet server IP address, and information associated with the target base station. The fallback mode indicator refers to an indicator that indicates to operate in a fallback mode, and the Internet server IP address refers to an IP address of an Internet server that provides the same service as the low latency base station server 1650. Information associated with the target base station includes, for example, identification information of the target base station, information on a low latency service supported by the target base station, and the like.

The low latency terminal 1600 changes an operation mode to the fallback mode based on the fallback mode indicator included in the received handover command message (step 1624), and transmits a handover confirmation message to the low latency base station 1620 indicated by information associated with the target base station, included in the received handover command message (step 1626) so as to perform a handover.

In addition, the low latency terminal 1600 establishes a (LTE) radio bearer 1628 with the low latency base station 1620 that has performed a handover, and an Internet bearer 1632 is provided between the low latency base station 1620 and the GW 1630 after the handover is performed. Later, the low latency terminal 1600 establishes a TCP session with the Internet server 1640 through the (LTE) radio bearer 1628 and the Internet bearer 1632 (step 1634).

The low latency base station 1610 checks whether the handover by the low latency terminal 1600 has been completed, and, when the handover has been completed, transmits a service deregistration request message to the low latency base station server 1650 (step 1636), so as to request deregistration of the low latency terminal 1600 from the low latency base station server 1650. The service deregistration request message includes at least one of an ID of the low latency terminal 1600, an ID of the low latency base station 1610 that is a source base station, and an ID of the F2 bearer 1604.

The low latency base station server 1650 cancels the registration of the low latency terminal 1600 by deleting a low latency terminal context (step 1638), and transmits a service deregistration response message to the low latency base station 1610 (step 1642).

The low latency base station 1610 cancels registration of the low latency terminal 1600 by deleting the low latency terminal context based on the received service deregistration response message (step 1644).

Figure 17:
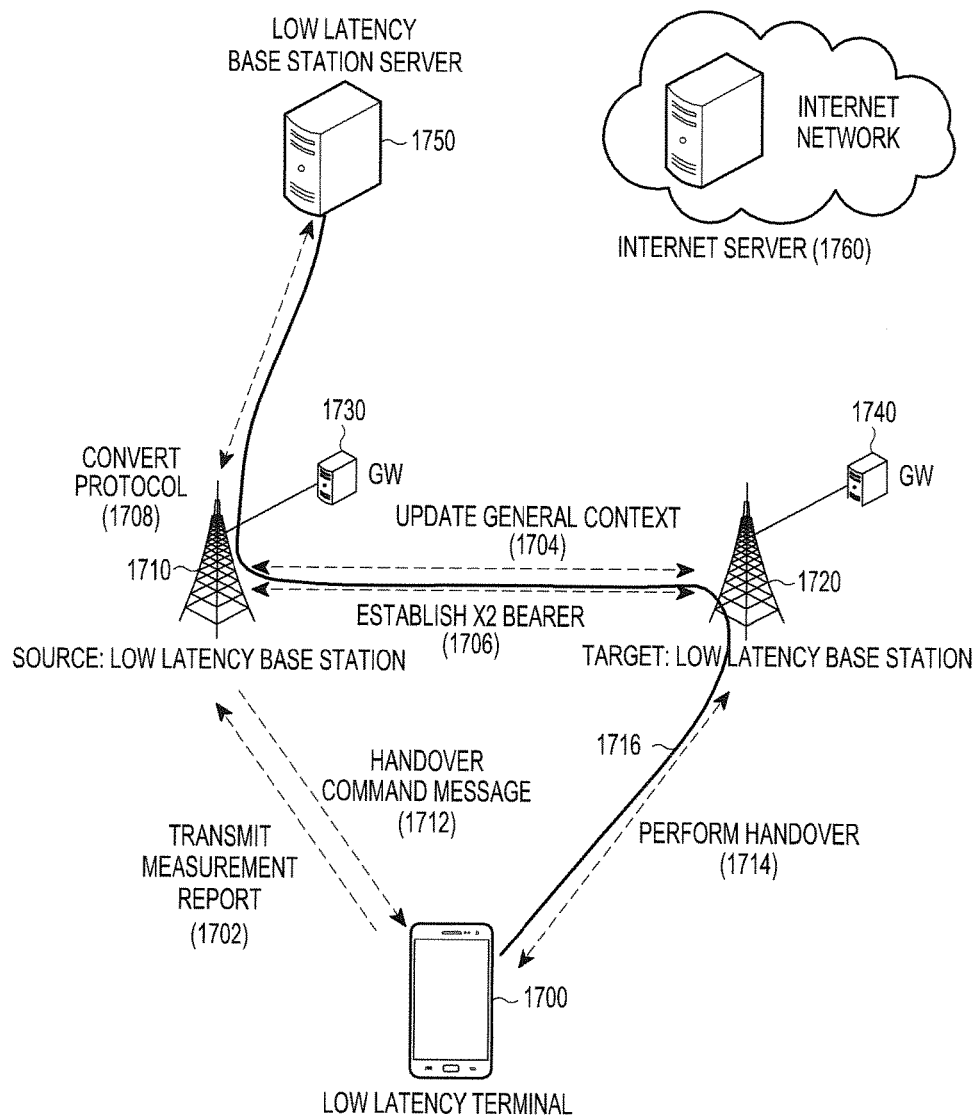
FIG. 17 is a diagram illustrating an example of performing a handover when a target base station is a legacy base station that does not support an on-going low latency service and the on-going low latency service is a service requiring session continuity, in a low latency providing system according to an embodiment of the present disclosure.

FIG. 17 is a diagram illustrating an example of performing a handover when a target base station is a legacy base station that does not support an on-going low latency service and the on-going low latency service is a service requiring session continuity, in a low latency providing system according to an embodiment of the present disclosure. In FIG. 17, an operation in step 714 of FIG. 7 (that is, anchoring an F2 bearer and changing a data protocol) is described in detail.

Referring to FIG. 17, an illustrated low latency providing system includes a low latency terminal 1700, a low latency base station 1710, a GW 1730 connected to the low latency base station 1710, a low latency base station 1520, a GW 1740 connected to the low latency base station 1720, a low latency base station server 1750, and an Internet server 1760. In addition, it is assumed that the low latency base station 1710 is a source base station of the low latency terminal 1700 and the low latency base station 1720 is a target base station of the low latency terminal 1700.

The low latency terminal 1700 transmits, periodically or when a specific event occurs, a measurement report to the low latency base station 1710 (step 1702). The measurement report includes information on neighboring base stations to which the low latency terminal 1700 may perform a handover.

The low latency base station 1710 selects a target base station based on the measurement report received from the low latency terminal 1700. Here, it is assumed that the selected target base station (that is, the low latency base station 1720) is a legacy base station. The low latency base station 1710 updates a context by transmitting a general context to the selected low latency base station 1720 (step 1704) and establishes an X2 bearer with the low latency base station 1720 (step 1706). The general context has been described in detail in TABLE 1, and a description thereof will be thus omitted here.

Later, the low latency base station 1710 transmits, to the low latency base station 1720 through the X2 bearer, data associated with a low latency service received from the low latency base station server 1750. Here, the low latency base station 1710 converts a protocol of data associated with the low latency service received from the low latency base station server 1750 (step 1708). That is, the low latency base station 1710 adds a TCP/IP stack to the data associated with the low latency service received from the low latency base station server 1750, so as to transmit the same to the low latency base station 1720. According to an example described herein, steps 1704, 1706, and 1708 are sequentially performed. However, depending on a case, steps 1704, 1706, and 1708 may be concurrently performed and/or one of steps 1704, 1706, and 1708 may be performed first.

In addition, the low latency base station 1710 transmits a handover command message to the low latency terminal 1700 to indicate to perform a handover to the low latency base station 1720 that is the target base station (step 1712). Here, the handover command message includes information associated with the target base station, for example, identification information of the target base station, information on a low latency service supported by the target base station, and the like.

The low latency terminal 1700 performs a handover to the low latency base station 1720 that is a target base station (step 1714). The low latency terminal 1700, which has performed the handover from the low latency base station 1710 that is a source base station to the low latency base station 1720 that is a target base station, continuously receives data associated with an on-going low latency service from the low latency base station server 1750 through an illustrated path 1716. That is, the low latency terminal 1700 may maintain an existing service connection through an X2 bearer established between the low latency base station 1710 and the low latency base station 1720. The embodiment of the present disclosure has described an example in which an X2 bearer is provided between the low latency base station 1710 and the low latency base station 1720. However, a bearer other than the X2 bearer may be provided between the low latency base station 1710 and the low latency base station 1720.

Figure 18A:
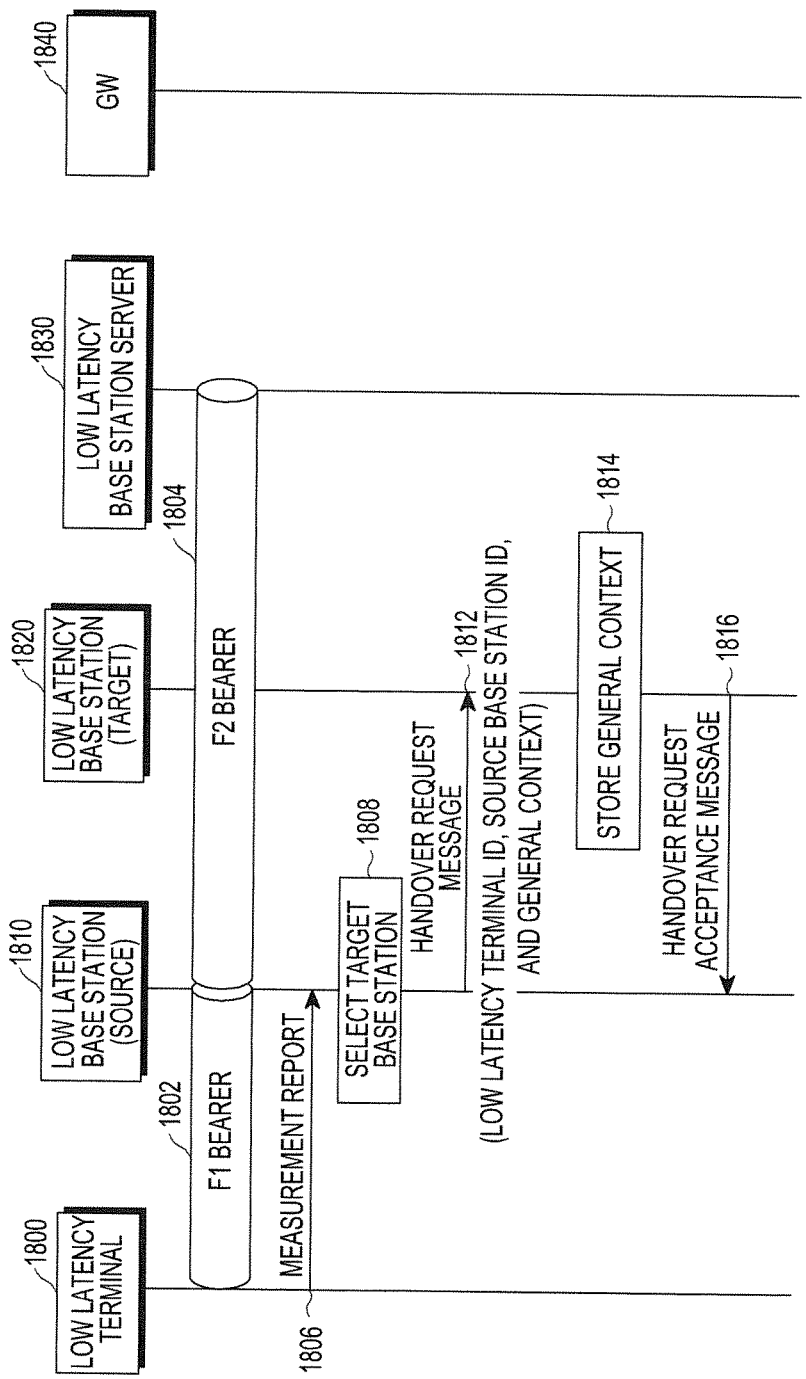
FIGS. 18A and 18B are signal flow diagrams illustrating an example of a procedure for performing a handover when a target base station is a legacy base station that does not support an on-going low latency service and the on-going low latency service is a service requiring session continuity, in a low latency providing system according to an embodiment of the present disclosure.
Figure 18B:
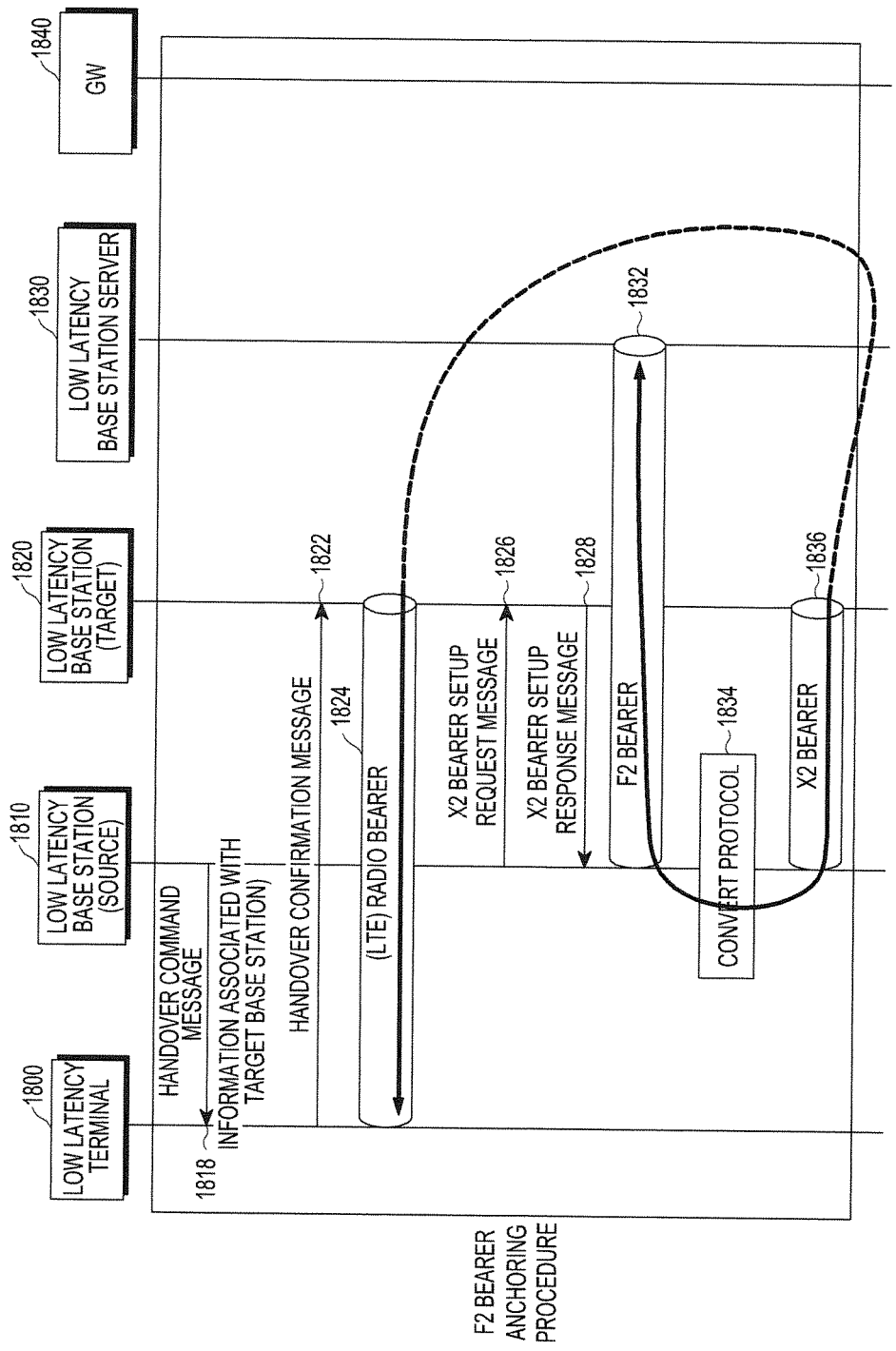

FIGS. 18A and 18B are signal flow diagrams illustrating an example of a procedure for performing a handover when a target base station is a legacy base station that does not support an on-going low latency service and the on-going low latency service is a service requiring session continuity, in a low latency providing system according to an embodiment of the present disclosure.

Referring to FIGS. 18A and 18B, an illustrated low latency providing system includes a low latency terminal 1800, a low latency base station 1810 that is a source base station, a low latency base station 1820 that is a target base station, a low latency base station server 1830, and a GW 1840. The GW 1840 may be, for example, a base station GW and/or an SAE GW.

In addition, it is assumed that an F1 bearer 1802 is provided between the low latency terminal 1800 and the low latency base station 1810, and an F2 bearer 1804 is provided between the low latency base station 1810 and the low latency base station server 1830.

The low latency terminal 1800 transmits, periodically or when a specific event occurs, a measurement report to the low latency base station 1810 (step 1806). The measurement report includes information on neighboring base stations to which the low latency terminal 1800 may perform a handover.

The low latency base station 1810 selects a target base station based on the measurement report received from the low latency terminal 1800 (step 1808). Here, it is assumed that the selected target base station (that is, the low latency base station 1820) is a legacy base station. The low latency base station 1810 transmits a handover request message that requests a handover to the selected low latency base station 1820 (step 1812). The handover request message includes at least one of an ID of the low latency terminal 1800, an ID of the low latency base station 1810 that is a source base station, and a general context. The general context has been described in detail in TABLE 1, and a description thereof will be thus omitted The low latency base station 1820 stores the general context included in the received handover request message (step 1814), and transmits, to the low latency base station 1810, a handover request acceptance message for accepting a handover request of the low latency base station 1810 (step 1816). The low latency base station 1810 transmits, to the low latency terminal 1800, a handover command message that commands to perform a handover to the target base station (step 1818). The handover command message includes information associated with the target base station, for example, identification information of the target base station, information on a low latency service supported by the target base station, and the like.

The low latency terminal 1800 transmits a handover confirmation message to the low latency base station 1820 indicated by information associated with the target base station, which is included in the received handover command message (step 1822), so as to perform a handover. After the handover is performed, a (LTE) radio bearer 1824 is established between the low latency terminal 1800 and the low latency base station 1820.

The low latency base station 1810 transmits, to the low latency base station 1820, an X2 bearer setup request message for requesting an X2 bearer establishment (step 1826), and receives, from the low latency base station 1820, an X2 bearer setup response message (step 1828), so as to establish an X2 bearer 1834. An X2 bearer establishment method used in a legacy system (for example, an LTE system) may be applied to a method for establishing the X2 bearer 1834.

The low latency terminal 1800 may continuously receive data associated with the low latency service that has been received through the F2 bearer 1832 pre-established before performing the handover, through the X2 bearer 1836 provided between the low latency base station 1810 that is the source base station and the low latency base station 1820 that is the target base station even after performing the handover. That is, the X2 bearer 1836 performs anchoring of the radio bearer 1824 provided between the low latency terminal 1800 and the low latency base station 1820, and the F2 bearer 1832 provided between the low latency base station 1810 and the low latency base station server 1830.

The low latency terminal 1800 receives data associated with the low latency service transmitted from the low latency base station server 1830 through the F2 bearer 1832, the X2 bearer 1836, and the (LTE) radio bearer 1824. Here, the low latency base station 1810 converts a protocol by adding a TCP/IP stack to the data associated with the low latency service received from the low latency base station server 1830 through the F2 bearer 1832 (step 1834), and transmits the same to the low latency terminal 1800 through the X2 bearer 1836 and the (LTE) radio bearer 1824. The embodiment of the present disclosure has described an example in which an X2 bearer is provided between the low latency base station 1810 and the low latency base station 1820. However, a bearer other than the X2 bearer may be provided between the low latency base station 1810 and the low latency base station 1820.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

In addition, it will be understood that the method for maintaining a service connection provided through an access layer according to embodiments of the present disclosure may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can also be appreciated that the software may be stored in a machine (for example, a computer)-readable storage medium. A graphic screen update method of the present disclosure can be realized by a computer or a portable terminal including a controller and a memory, and it can be seen that the memory corresponds to an example of the storage medium which is suitable for storing a program or programs including instructions by which the embodiments of the present disclosure are realized, and is machine readable.

Accordingly, the present disclosure includes a program for a code implementing the apparatus and method described in the appended claims of the specification and a machine (a computer or the like)-readable storage medium for storing the program. Further, the program may be electronically transferred by a predetermined medium such as a communication signal transferred through a wired or wireless connection, and the present disclosure appropriately includes equivalents of the program.

Further, in embodiments of the present disclosure, the program may be received from the apparatus for maintaining a service connection provided through an access layer and may be stored. The program supply device may include a program that includes instructions to perform, by a graphic processing device, a preconfigured content protection method, a memory that stores information or the like required for the content protection method, a communication unit that conducts wired or wireless communication with the graphic processing unit, and a control unit that transmits a corresponding program to a transmission/reception device in response to the request from the graphic processing device or automatically.

The invention claimed is:

1. A method for providing a service by a target base station in a wireless communication system, the method comprising:
   transmitting, to a low latency base station server that uses a low latency layer to communicate between an application layer and a data link layer, a first request message for a re-establishment of a first bearer between the target base station and the low latency base station server, the first request message including at least one of an ID of a terminal, an ID of a source base station, an ID of the target base station, and an ID of a bearer between the source base station and the low latency base station server;
   receiving, from the low latency base station server, a first response message indicating that the re-establishment of the first bearer is accepted;
   receiving, through the first bearer, first data associated with a service provided by the low latency base station server; and
   transmitting, to the terminal, the first data.

2. The method of claim 1, further comprising:
   when the target base station does not support an on-going service and receives a service from an Internet server, wherein the on-going service is a service that requires session continuity, receiving, from the source base station, a request message for an establishment of a second bearer between the target base station and the source base station;
   transmitting, to the source base station, a response message indicating that the establishment of the second bearer is accepted;
   receiving, through the second bearer, data associated with a service provided by the low latency base station server; and
   transmitting, to the terminal, the data.

3. The method of claim 2, further comprising:
   receiving, from the source base station, information associated with a general context so as to store the information, wherein the information associated with the general context is used for receiving data associated with the service provided by the Internet server.

4. The method of claim 1, further comprising:
   when the target base station does not support an on-going service and receives a service from an Internet server, wherein the on-going service is a service that does not require session continuity, receiving data associated with a service provided by the Internet server; and
   transmitting, to the terminal, the data.

5. The method of claim 1, further comprising:
   when the target base station does not support an on-going service and receives a service from the low latency base station server, wherein the on-going service is a service that requires session continuity, receiving, from the source base station, a request message for an establishment of a second bearer between the target base station and the source base station;
   transmitting, to the source base station, a response message indicating that the establishment of the second bearer is accepted;
   receiving, through the second bearer, data associated with a service provided by the low latency base station server; and
   transmitting, to the terminal, the data.

6. The method of claim 1, further comprising:
   when the target base station does not support an on-going service and receives a service from the low latency base station server, wherein the on-going service is a service that does not require session continuity, receiving data associated with a service provided by an Internet server; and transmitting, to the terminal, the data.

7. The method of claim 1, further comprising:

receiving, from the source base station, at least one of information associated with a general context or information associated with a low latency context so as to store the same information, wherein the information associated with the general context is used for receiving data associated with the service provided from an Internet server, and the information associated with the low latency context is used for receiving data associated with the service provided from the low latency base station server.

8. A method for receiving a service by a terminal in a wireless communication system, the method comprising:

receiving, from a source base station, a handover command message including information associated with a target base station, to which a handover is performed;

performing the handover to the target base station; and receiving, through a first bearer re-established between the target base station and a low latency base station server that uses a low latency layer to communicate between an application layer and a data link layer, first data associated with a service provided by the low latency base station server, wherein the first bearer is re-established based on at least one of an ID of the terminal, an ID of the source base station, an ID of the target base station, and an ID of a bearer between the source base station and the low latency base station server.

9. The method of claim 8, further comprising;

when the target base station does not support an on-going service and the on-going service is a service that requires session continuity, receiving, through a second bearer established between the source base station and the target base station, data associated with the service provided by the low latency base station server.

10. The method of claim 8, further comprising;

when the target base station does not support an on-going service and the on-going service is not a service that requires session continuity, receiving data associated with a service provided by an Internet server.

11. A target base station for providing a service in a wireless communication system, the target base station comprising:

a transceiver; and a controller configured to control the transceiver to:

transmit, to a low latency base station server that uses a low latency layer to communicate between an application layer and a data link layer, a first request message for a re-establishment of a first bearer between the target base station and the low latency base station server, the first request message including at least one of an ID of a terminal, an ID of a source base station, an ID of the target base station, and an ID of a bearer between the source base station and the low latency base station server;

receive, from the low latency base station server, a first response message indicating that the re-establishment of the first bearer is accepted;

receive, through the first bearer, first data associated with a service provided by the low latency base station server; and transmit, to the terminal, the first data.

12. The target base station of claim 11, wherein the controller is further configured to:

when the target base station does not support an on-going service and receives a service from an Internet server, wherein the on-going service is a service that requires session continuity, receive, from the source base station, a request message for an establishment of a second bearer between the target base station and the source base station;

transmit, to the source base station, a response message indicating that the establishment of the second bearer is accepted;

receive, through the second bearer, data associated with a service provided by the low latency base station server; and transmit, to the terminal, the data.

13. The target base station of claim 12, wherein the controller is further configured to:

receive, from the source base station, information related to a general context used for receiving data associated with a service provided by an Internet server, and wherein the information related to the general context is stored in a storing unit.

14. The target base station of claim 11, wherein the controller is further configured to:

when the target base station does not support an on-going service and receives a service from an Internet server, wherein the on-going service is a service that does not require session continuity, receive data associated with a service provided by the Internet server; and transmit, to the terminal, the data.

15. The target base station of claim 11, wherein the controller is further configured to:

when the target base station does not support an on-going service and receives a service from the low latency base station server, wherein the on-going service is a service that requires session continuity, receive, from the source base station, a request message for an establishment of a second bearer between the target base station and the source base station;

transmit, to the source base station, a response message indicating that the establishment of the second bearer is accepted;

receive, through the second bearer, data associated with a service provided by the low latency base station server; and transmit, to the terminal, the data.

16. The target base station of claim 11, wherein the controller is further configured to:

when the target base station does not support an on-going service and receives a service from the low latency base station server, wherein the on-going service is a service that does not require session continuity, receive data associated with a service provided by an Internet server; and transmit, to the terminal, the data.

17. The target base station of claim 11, wherein the controller is further configured to:

receive, from the source base station, at least one of information associated with a general context and information associated with a low latency context so as to store the same information, wherein information associated with the general context is used for receiving data associated with the service provided by an Internet server, and information associated with the low latency context is used for receiving data associated with the service provided by the low latency base station server.

18. A terminal for receiving a service in a wireless communication system, the terminal comprising:
- a transceiver; and
- a controller configured to:
  - receive, from a source base station, a handover command message including information associated with a target base station, to which a handover is performed;
  - perform the handover to the target base station; and
  - receive, through a first bearer re-established between the target base station and a low latency base station server that uses a low latency layer to communicate between an application layer and a data link layer, first data associated with a service provided from the low latency base station server,
- wherein the first bearer is re-established based on at least one of an ID of the terminal, an ID of the source base station, an ID of the target base station, and an ID of a bearer between the source base station and the low latency base station server.

19. The terminal of claim 18, wherein the controller is further configured to:
- when the target base station does not support an on-going service and the on-going service is a service that requires session continuity, receive, through a second bearer established between the source base station and the target base station, data associated with the service provided by the low latency base station server.

20. The terminal of claim 18, wherein the controller is further configured to:
- when the target base station does not support an on-going service and the on-going service is not a service that requires session continuity, receive data associated with a service provided by an Internet server.

* * * * *